US010811201B1

(12) United States Patent
Files et al.

(10) Patent No.: US 10,811,201 B1
(45) Date of Patent: Oct. 20, 2020

(54) EXTENDING THE BATTERY LIFE OF A KEYBOARD DEVICE COUPLED TO A DUAL-DISPLAY COMPUTING DEVICE

(71) Applicant: Dell Products L. P., Round Rock, TX (US)

(72) Inventors: Jace W. Files, Round Rock, TX (US); John Trevor Morrison, Round Rock, TX (US); Gerald Rene Pelissier, Mendham, NJ (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/392,867

(22) Filed: Apr. 24, 2019

(51) Int. Cl.
  *G09G 5/10* (2006.01)
  *H01H 13/83* (2006.01)
  *G06F 3/02* (2006.01)
  *G06F 3/14* (2006.01)

(52) U.S. Cl.
  CPC .......... *H01H 13/83* (2013.01); *G06F 3/0202* (2013.01); *G06F 3/1446* (2013.01); *G09G 5/10* (2013.01); *G09G 2360/144* (2013.01); *G09G 2380/14* (2013.01); *H01H 2219/037* (2013.01); *H01H 2219/038* (2013.01); *H01H 2219/039* (2013.01)

(58) Field of Classification Search
  CPC .............. H01H 2219/039; H01H 13/83; G06F 3/0219; G06F 11/326
  See application file for complete search history.

(56) References Cited

U.S. PATENT DOCUMENTS

| | | | |
|---|---|---|---|
| 7,236,154 B1* | 6/2007 | Kerr | G09G 5/10 345/102 |
| 7,990,702 B2* | 8/2011 | Tracy | G06F 1/1616 361/679.55 |
| 2006/0192748 A1* | 8/2006 | Lowles | G06F 1/3203 345/102 |
| 2010/0039764 A1* | 2/2010 | Locker | G06F 1/1669 361/679.29 |
| 2010/0302169 A1* | 12/2010 | Pance | G06F 3/0237 345/170 |
| 2012/0274565 A1* | 11/2012 | Moser | G06F 1/1662 345/168 |
| 2019/0041919 A1* | 2/2019 | Makinen | G06F 1/1669 |
| 2019/0066576 A1* | 2/2019 | Krancher | G06F 1/1662 |
| 2019/0121399 A1* | 4/2019 | Ku | G06F 1/169 |

* cited by examiner

*Primary Examiner* — Temesghen Ghebretinsae
*Assistant Examiner* — Karin Kiyabu
(74) *Attorney, Agent, or Firm* — Campbell Stephenson LLP; Shiv S. Naimpally

(57) ABSTRACT

In some embodiments, a keyboard may comprise internal light sources to backlight keycaps. In addition, the keyboard may provide one or more unobstructed paths for light from an external light source located beneath the keyboard to reach the keycaps. When the keyboard is placed onto the external light source, the keycaps within the keyboard may be illuminated from the external light source. When the keyboard is placed on a display device of a dual-display computing device, one display device may be used to present text and images to a user while the other display device provides backlighting for the keyboard. Software may manage the image shown on the display device located under the keyboard device to alter the appearance of the keycaps. The keyboard battery life may be extended by disabling key backlights within the keyboard when the dual-display computing device provide the backlight.

20 Claims, 12 Drawing Sheets

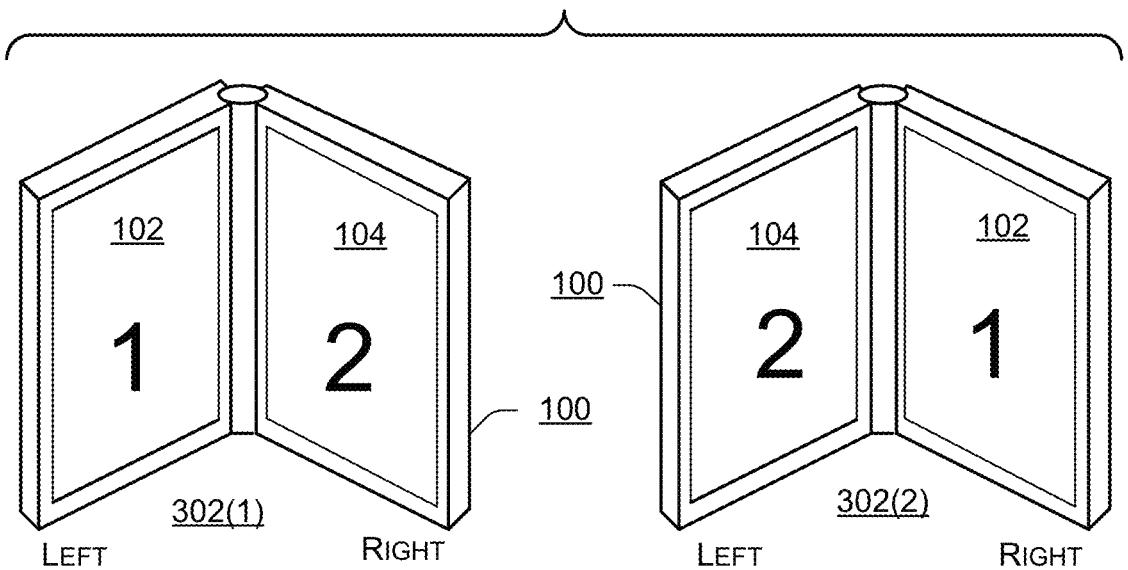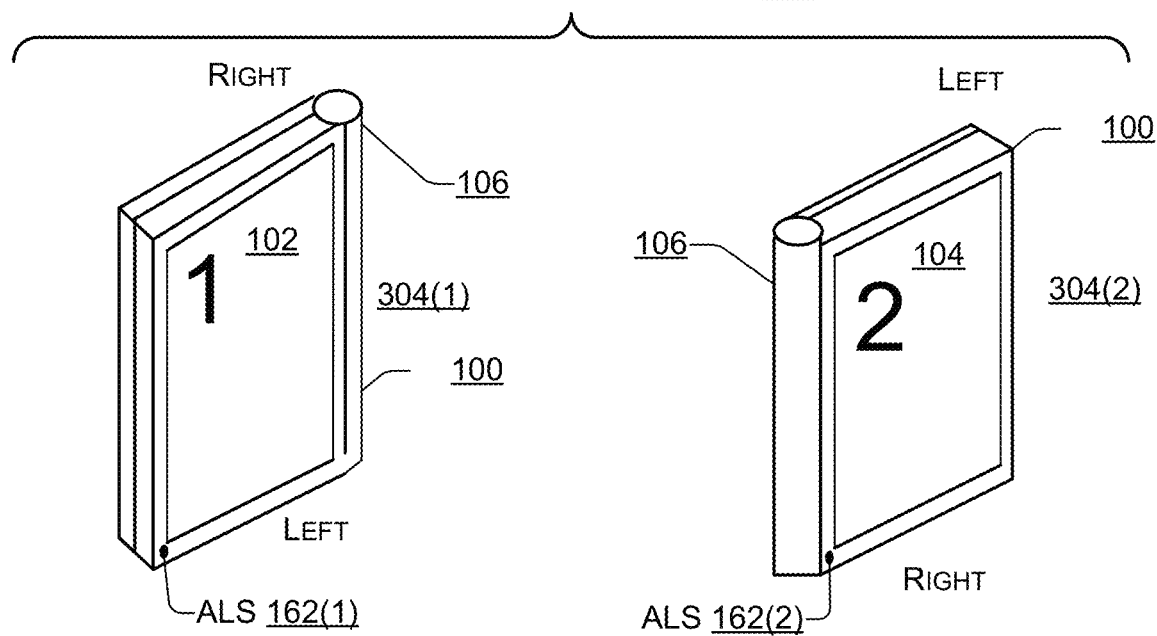
FIG. 3

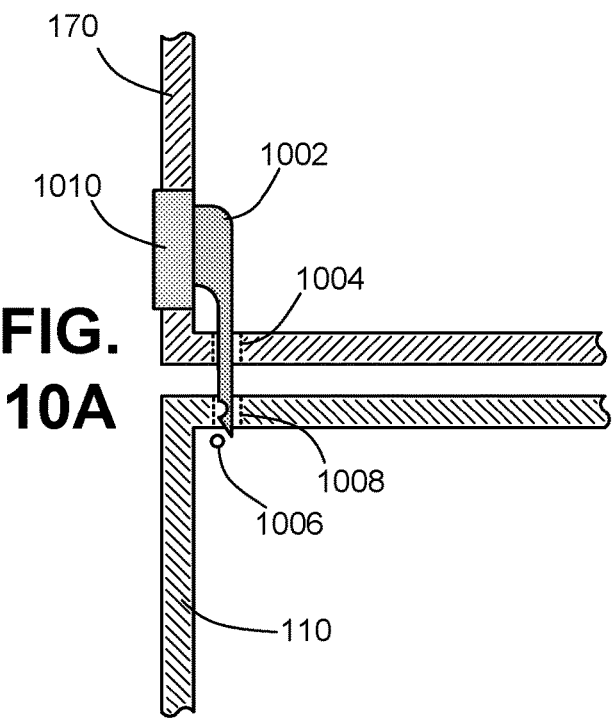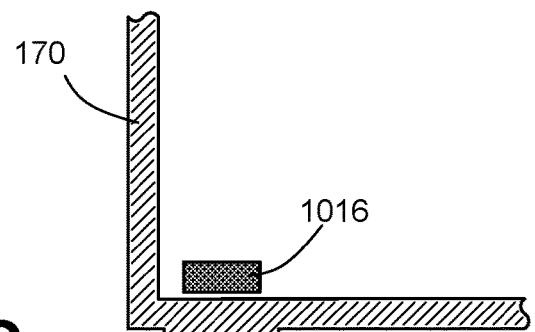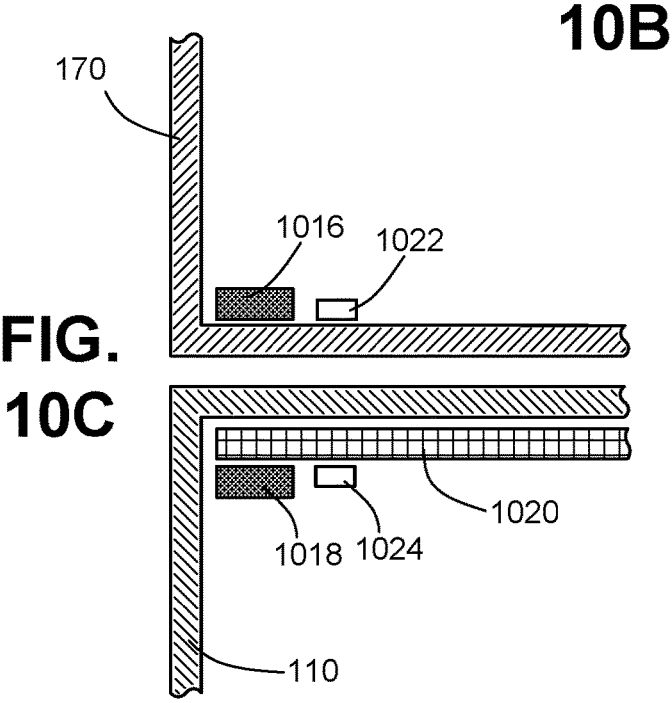

EXTENDING THE BATTERY LIFE OF A KEYBOARD DEVICE COUPLED TO A DUAL-DISPLAY COMPUTING DEVICE

BACKGROUND OF THE INVENTION

Field of the Invention

This invention relates generally to keyboard devices capable of increasing the visibility of keycaps in poorly lit environments using either illumination from light sources internal to the keyboard or illumination provided by an external light source and the extension of battery life obtained from using an external light source.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Dual-screen computing devices are gaining in popularity with the advent of thinner screens (e.g., using technologies such as organic light emitting diode (OLED) or the like). Such devices normally provide a keyboard-like interface by displaying a keyboard overlay on one of the touch-screens. However, users tend to prefer a mechanical keyboard as it provides more tactile feedback and because most users are used to providing input using a mechanical keyboard. In addition, users prefer a mechanical keyboard with backlit keys.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some embodiments, a keyboard may use one or more internal light sources to backlight keycaps when the keyboard is used in dim lighting. In addition, for each keycap that is backlit, the keyboard may provide one or more unobstructed paths for light, from an external light source located beneath the keyboard, to reach the keycap. An unobstructed path may pass through (i) a transparent material, (ii) voids within the keyboard, or both. When the keyboard is placed onto the external light source (e.g., a display screen of dual-screen device), the keycaps within the keyboard may be illuminated by the external light source instead of by the internal light sources.

When the keyboard is placed on a display device of a dual-display computing device, one display device of the dual-display computing device may be used to present text and images to a user while the other display device may be used as an external light source to provide backlighting to the keyboard. Software executing on the dual-display computing device may manage the image shown on the display device located under the keyboard device to alter the appearance of the keycaps. The system comprising the dual-display computing device and the keyboard may extend the life of one or more keyboard batteries by disabling key backlights within the keyboard when the display device is available to provide the backlighting.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

FIG. 3 illustrates book and vertical tablet orientations of the dual-display computing device according to some embodiments.

FIG. 10A is a detail view of an alignment and/or coupling mechanism for a keyboard device and a dual-display computing device illustrating the use of a mechanical latch according to some embodiments.

FIG. 10B is a detail view of an alignment and/or coupling mechanism for a keyboard device and a dual-display computing device illustrating the use of a shaped protrusion and a shaped indentation according to some embodiments.

FIG. 10C is a detail view of an alignment and/or coupling mechanism for a keyboard device and a dual-display computing device illustrating the use of magnets according to some embodiments.

DETAILED DESCRIPTION

Figure 1:
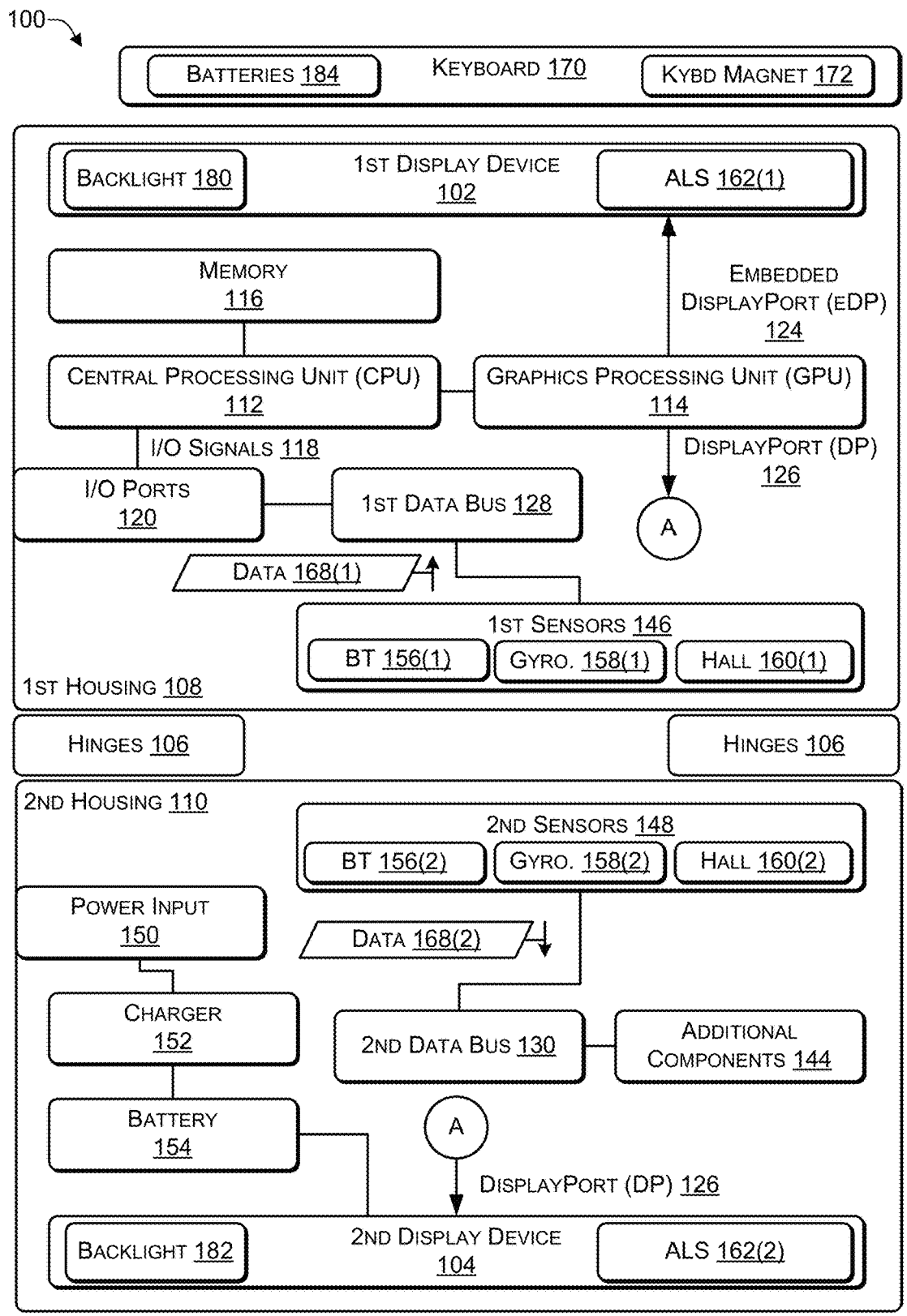
FIG. 1 is a block diagram of an architecture of a dual-display computing device according to some embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

An embodiment of a mechanical keyboard ("keyboard") described herein may provide key backlights that are internal to the keyboard. The keyboard may be part of an information handling system, such as dual-screen device. The key backlights may illuminate keycaps from underneath, making legends on the keycaps readable even in dim ambient lighting. The keyboard may include an ambient light sensor (ALS) to monitor the ambient lighting. The keyboard may disable the key backlights to conserve keyboard battery life when information collected from the ambient light sensor (ALS) indicates that the key backlights are not needed. The keyboard may include a keyboard battery sensor to monitor the remaining charge of one or more keyboard batteries. The keyboard battery sensor may disable the key backlights to preserve the remaining keyboard for communication purposes when the battery charge level drops below a predetermined battery charge threshold (e.g., 30%, 20%, 10%, 5% or the like) to extend a battery life of the battery.

For each keycap that is backlit, the keyboard may further include one or more unobstructed paths for light from an external light source located beneath the keyboard to reach the keycap such that light from the external light source may be used to illuminate the keycaps from underneath. An unobstructed path may pass through (i) a transparent material, (ii) voids within the keyboard, or both.

The keyboard may be used with a dual-display (e.g., dual-screen) computing device and may wirelessly communicate with the dual-display computing device having a first display device and a second display device. In some configurations, the keyboard may be placed adjacent to the dual-display computing device and the first display device and the second display device may be used to present (e.g., display) text, images, or other data. The dual-displays of the dual-display computing device may be positioned in one or multiple physical orientations, such as, for example, a horizontal orientation, a vertical orientation, book orientations, tablet orientations, presentation orientations, tent orientations, or clamshell orientations. The keyboard may enable the key backlights that are internal to the keyboard if (i) the ambient light sensor (ALS) indicates that the ambient light is below a predetermined threshold and (ii) the keyboard battery sensor indicates that sufficient (e.g., at least a predetermined amount of) battery charge remains (e.g., 30%, 20%, 10% or the like). When the key backlights are enabled, the backlights may draw power from the one or more keyboard batteries, causing the one or more keyboard batteries to be depleted at a much higher rate than if the key backlights were disabled. In this way, by using the key backlights under specific conditions and not using them otherwise, battery life of the dual-display computing device may be extended.

In some configurations, the dual-display computing device may be opened to a clamshell orientation in which the first display device may present text and images while the keyboard is placed on top of the second display device. In such configurations, the second display device may provide the external source of illumination for the keyboard. The system comprising the keyboard, the dual-display computing device, and software executing on the dual-display computing device may determine that the keyboard is positioned on the second display device and may manage the second display device to conserve keyboard battery life and to enhance the user's experience. As non-limiting examples, the system may disable the key backlights that are internal to the keyboard and may cause the second display device to function as a backlight to provide illumination to the bottom of the keyboard to backlight the keycaps. The illumination provide by the second display device may travel through the transparent bottom of the keyboard and may be focused on the keycaps by a lensing system within the keyboard. A first portion of the second display device (e.g., that is beneath the keyboard) may display a white image to provide an external backlight while a second portion of the second display device that surrounds the keyboard may display a black image. In some cases, a third portion of the second display device may be used to display an area to be used as a trackpad. The trackpad area may be a white area (or a colored area) within the black image.

In some cases, the system may change the image in a portion of the second display device that is beneath a specific key of the keyboard in order to change the on/off state, intensity, or color of the backlighting provided to that specific key. The system may manage the color and intensity of key backlighting for individual keys, groups of keys, or the entire keyboard. For example, a set of color-coded keys may be provided for a specific application, such as a word processing application, a presentation graphics application, a gaming application, or the like.

The keyboard may couple to the dual-display computing device in such a way that the keyboard is held in a position that aligns the keyboard with a particular portion of the second display device. For example, the keyboard may couple to the dual-display computing device and may be held in place on the second display device using mechanical latches, by the alignment of mechanical protrusions and indentation, by magnets, by electromagnets, by other types of alignment and coupling devices, or combinations thereof. The keyboard may be substantially the same width as the second display device but may be shorter in a front-to-back direction than the second display device. In some cases, the system may permit alignment and coupling between the keyboard and the second display device (or the first display device) in more than one position. For example, the system may enable the keyboard to be positioned with one edge of the keyboard substantially above one edge of the second display device.

In some cases, the keyboard may be positioned on the second display device in a position that places the rear of the keyboard near (substantially adjacent to) the first display device. In this position, the portion of the second display device that extends beyond the footprint of the keyboard may be located in front of the keyboard—between the keyboard and a user. Since the second display device may be touch sensitive, the system may provide a track pad function using this portion of the second display device. To provide the trackpad function, the system may display an image on the second display device illustrating a touch target (e.g., trackpad area). The system may receive touch inputs from the second display device. The touch inputs may be interpreted as requests to move the cursor, simulate the depression of one or more mouse buttons, or other input-related functions. In some embodiments, the touch target may be a rectangular portion of the display.

In some cases, the system may compensate for differences in the paths that the key backlight may follow as the light travels from the second display device to the keycaps when the keyboard is positioned on the dual-display computing device (e.g., the second display device is being used to provide the backlight). For example, measurements of the actual or perceived brightness of each of the keys on the keyboard may be taken and stored in the system as a keyboard brightness profile. Later, when the keyboard is positioned at the same location on the dual-display computing device and is backlit by the second display device, the system may adjust the image displayed under each key to be brighter or dimmer based on the keyboard brightness profile to make each key appear to have the same backlight intensity. Multiple keyboard brightness profiles may be saved. For example, each of the two display devices may have a separate brightness profile and each location of multiple attachment locations for the keyboard on each display device may have a particular brightness profile.

In some cases, the system may use an ambient light sensor (ALS) located within the dual-display computing device (or near each display device) to determine when key backlighting is to be used and how much light intensity is to be provided by the backlighting. Based on data provided by the ALS, the system may modify the image displayed (e.g., light projected) by the second display device to increase or decrease the intensity of the light reaching the keycaps.

In this document, the keyboard is described as being located on the second display device purely for illustration purposes. It should be understood that the keyboard may be placed on either the first display device or the second display device and that what is being performed when using the keyboard on the second display device may also be performed when the keyboard is on the first display device. If the keyboard is placed on the first display device, then the second display device may present text and images and the first display device may provide keycap backlight illumination and, in some cases, a track pad function. If the keyboard is placed on the second display device, then the first display device may present text and images and the second display device may provide keycap backlight illumination and, in some cases, a track pad function.

FIG. 1 is a block diagram of an architecture of a computing device according to some embodiments. In some implementations, the computing device 100 may include two (or more) housings while in other implementations the computing device 100 may include a single housing (e.g., a tablet form factor). As illustrated in FIG. 1, the computing device 100 may include a first housing 108 coupled to a second housing 110 via one or more hinges 106. The hinges 106 may enable the two housings 108, 110 to be positioned at different angles relative to each other in different orientations (e.g., various vertical orientations and various horizontal orientations). Of course, additional housings may be attached via additional hinges to create a computing device with multiple housings.

A first display device 102 may be located in the first housing 108 and, in some cases, a second display device 104 may be located in the second housing 110. The first display device 102 may comprise a first display backlight 180 and the second display device 104 may comprise a second display backlight 182. The first display backlight 180 and the second display backlight 182 may be operable to provide illumination for a keyboard 170 when the keyboard 170 is positioned on the first display device 102 or on the second display device 104. Alternatively, the first display device 102 and the second display device 104 may be active displays that produce their own illumination and do not require a backlight. As non-limiting examples, the first display device 102 and the second display device 104 may be displays based upon LED or OLED technologies. When the first display device 102 and the second display device 104 are active displays, the first display device 102 or the second display device 104 may be able to provide backlight for the keyboard 170 positioned on the display without the need of a backlight. The keyboard 170 may be powered by one or more batteries 184.

A first portion of the components of the computing device 100 may be located in the first housing 108 (e.g., behind the first display device 102) while a remaining portion of the components of the computing device 100 may be located in the second housing 110 (e.g., behind the second display device 104). As a non-limiting example, as illustrated in FIG. 1, the components located in the first housing 108 may include at least one central processing unit (CPU) 112, a graphics process unit (GPU) 114, and a memory (e.g., computer-readable media) 116. The CPUs and the GPU may generally be referred to as processors. The GPU 114 may be integrated into the CPU 112 or may be a separate device from the GPU 114. The CPU 112 may communicate input/output (I/O) signals 118 via multiple I/O ports 120. The I/O ports 120 may include video ports (e.g., a video graphics adapter (VGA) port, a digital video interface (DVI) port, a high definition media interface (HDMI) port, a ThunderBolt® port, or the like), audio ports (e.g., microphone jack, headphone jack, and the like), data ports (e.g., universal serial bus (USB) ports compliant with USB 2.0, USB 3.0, and the like), communication ports (e.g., Ethernet and the like), another type of port, or any combination thereof. In some cases, the computing device 100 may include at least one digital signal processing (DSP) processor 122 to perform audio (and video) signal processing. The GPU 114 may provide two or more lanes of embedded DisplayPort (eDP) output 124 that are sent to the first display device 102 in the first housing 108 and two or more lanes of DisplayPort (DP) output 126 that are sent (e.g., wirelessly or via a cable) to the second display device 104 in the second housing 110.

A first data bus 128 in the first housing 108 and a second data bus 130 in the second housing 110 may distribute data among the various components of the computing device 100. As a non-limiting example, the data buses 128, 130 may distribute data from the I/O signals 118, the I/O ports 120, a first set of sensors 146, a second set of sensors 148, and additional components 144. As a non-limiting example, the data buses 128, 130 may distribute data by receiving data from a component of the computing device 100 and transmitting the data to one or more of the other components of the computing device 100.

The second housing 110 may include a remaining portion of the components of the computing device 100. In some cases, the components in the second housing 110 may be located behind the second display device 104. The second housing 110 may include the additional components 144 (e.g., keyboard, touchpad, trackball, speaker, microphone, Wi-Fi antenna, Bluetooth antenna, Zigbee Antenna, cellular antenna, and the like), the second set of sensors 148, a power input 150 (e.g., alternating current (AC) or direct current (DC) input), a charger 152, and a battery 154. The battery charger 152 may be used as a power source to provide power instead of (or in addition to) the battery 154 when the battery 154 is depleted or inoperable. In some cases, data cables may run through the hinges 106 to connect the components of the computing device 100 located in the first housing 108 with the components of the computing device 100 located in the second housing 110. In other cases, a first wireless transceiver in the first housing 108 and a second wireless transceiver in the second housing 110 may provide wireless communications between (1) the components of the computing device 100 located in the first housing 108 and (2) the components of the computing device 100 located in the second housing 110.

The first set of sensors 146 and the second sensors 148 may include one or more of a touch-screen sensor, an accelerometer, a gyroscope, an electronic compass (e-compass), a barometer, a magnetometer, a proximity sensor, a light sensor, an imaging sensor (e.g., a camera), a fingerprint sensor, a global positioning satellite (GPS) sensor, another type of sensor, or any combination thereof.

The first set of sensors 146 may comprise a keyboard presence sensor 160(1) and the second sensors 148 may comprise a keyboard presence sensor 160(2). As non-limiting examples, the keyboard presence sensors 160(1), 160(2) may be Hall-effect sensors that are responsive to a keyboard magnet 172 located within the keyboard 170. Detecting that the keyboard 170 is present on the first display device 102 or the second display device 104 may trigger software executing on a dual-display computing device 100 to manage the display where the keyboard 170 has been placed such that the image presented on the display may determine the characteristics of backlight illumination provided to the keyboard 170 by the dual-display computing device 100.

In FIG. 1, the first set of components of the computing device 100 shown as being located in the first housing 108 and the remaining set of components shown as located in the second housing 110 are purely for illustration purposes. Depending on the implementation, different components of the computing device 100 may be housed in one or both of the housings 108, 110. As a non-limiting example, when the computing device 100 is designed for graphics processing, the GPU 114 and supporting hardware (e.g., graphics support chips, graphics memory, and the like) may be housed in the second housing 110. As another example, in some cases, the ports 120 may be located in the first housing 108, in the second housing 110, or split between the two housings 108, 110. As a further example, the battery 154 may include multiple power cells, with a portion of the power cells located in the first housing 108 and zero or more of the power cells located in the second housing 110. In some cases, which components of the computing device 100 are located in each of the housings 108, 110 may be determined by the thermal characteristics of the components. As a non-limiting example, the components may be distributed between the housings 108, 110 to enable each of the housings 108, 110 to heat to approximately the same temperature. Doing so may avoid grouping components that generate the most heat into the same housing, thereby causing one housing to be hotter than the other housing. In addition, while the computing device 100 is illustrated as having two display devices 102, 104, in some cases the computing device 100 may have a single display device, e.g., when the computing device 100 is configured as a tablet (e.g., all components in a single housing) or a laptop computing device (e.g., with a display in the first housing and input devices, such as a keyboard and touchpad, in the second housing).

Software instructions implementing an operating system and one or more applications, including at least one application capable of receiving stylus input, may be stored in the memory 116. The software instructions may be executed by the CPU 112, by the DSP processor 122, or any combination thereof.

Figure 2:
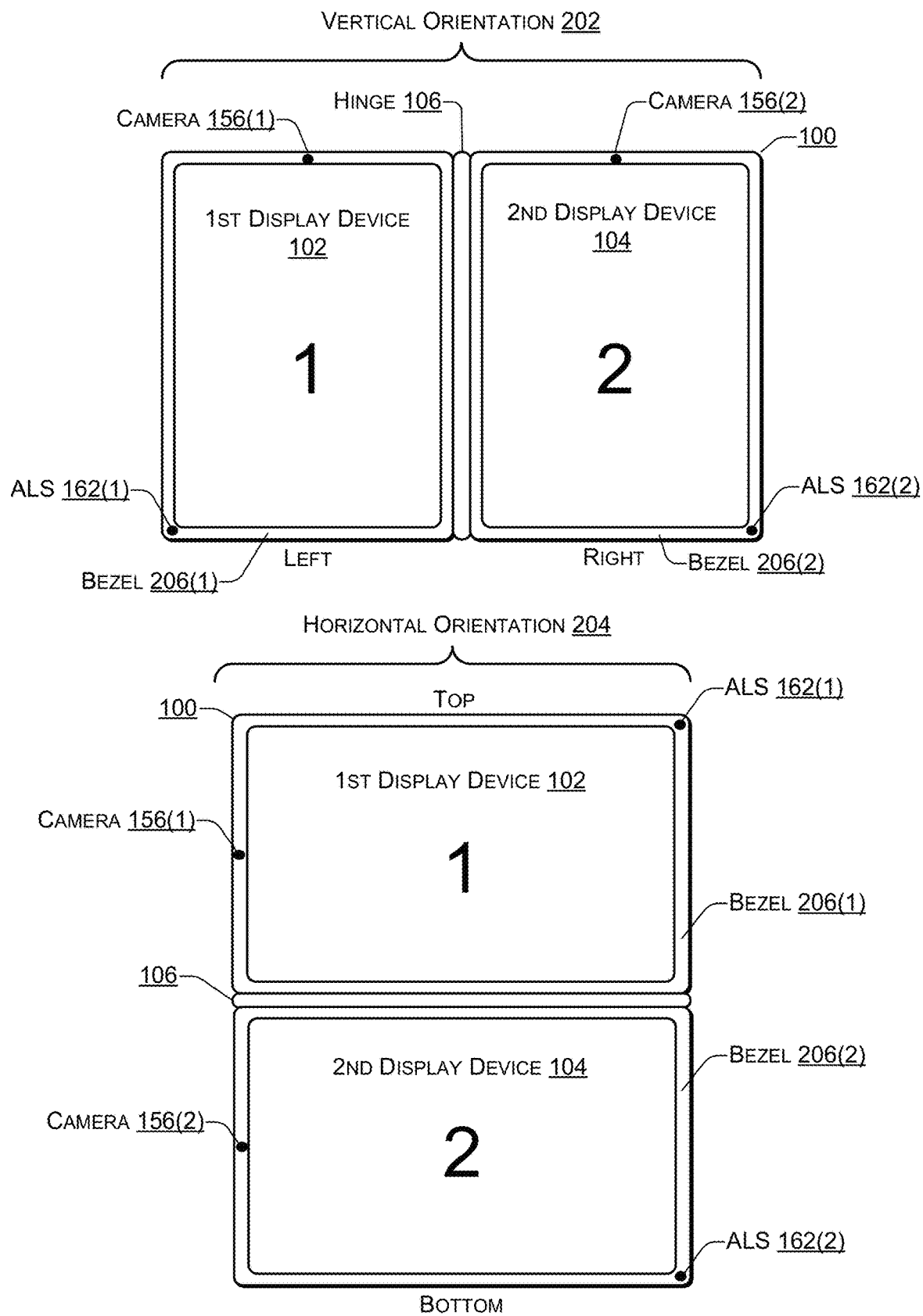
FIG. 2 illustrates vertical and horizontal orientations of the dual-display computing device according to some embodiments.
Figure 4:
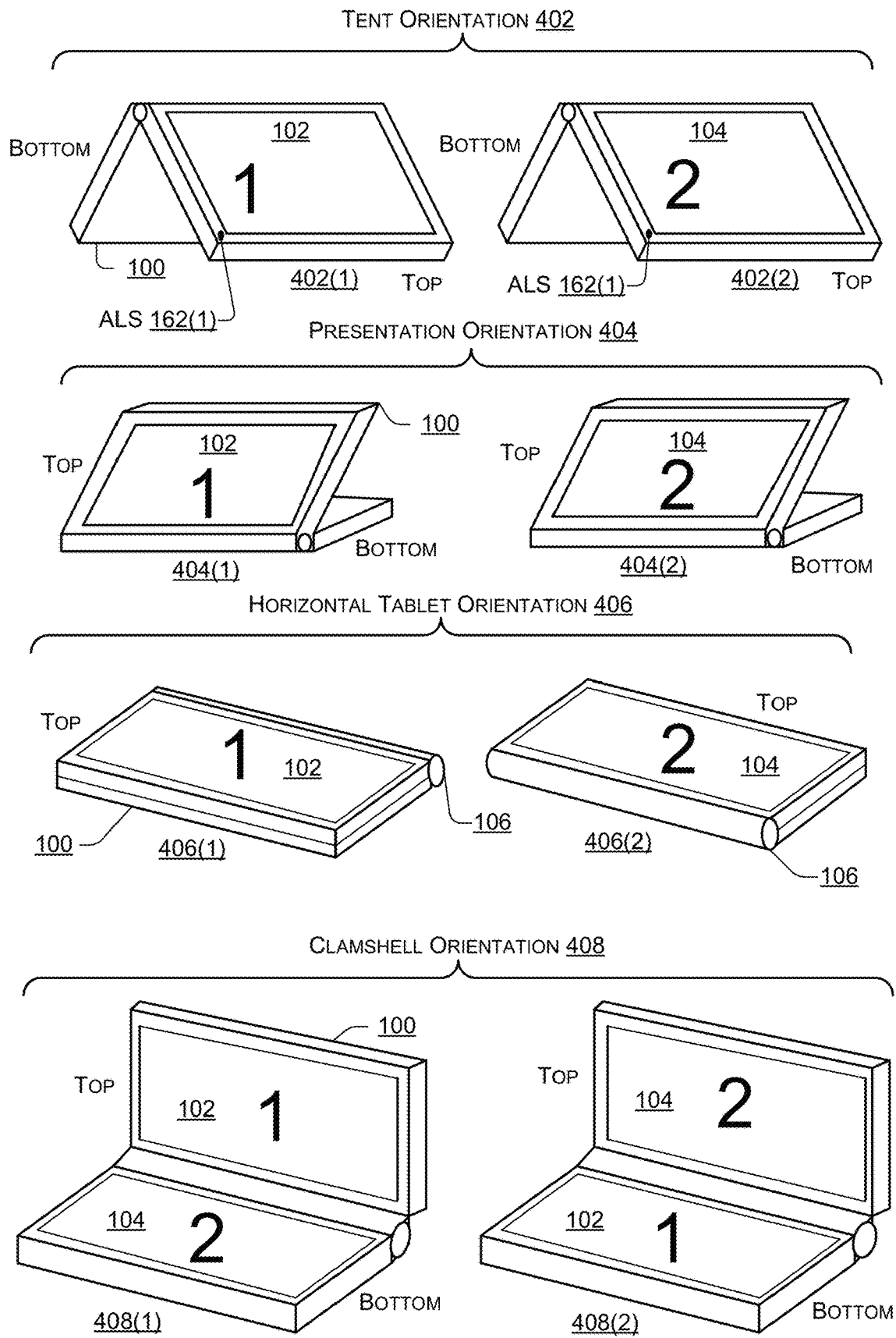
FIG. 4 illustrates tent, presentation, horizontal tablet, and clamshell orientations of the dual-display computing device according to some embodiments.

Thus, a computing device may include a first housing coupled to a second housing by one or more hinges. The computing device 100 may include software that may change the image presented on the second display device 104 when the keyboard 170 is known to be in contact FIG. 2 is a diagram 200 illustrating different orientations of a dual-display device (e.g., the computing device 100 of FIG. 1) according to some embodiments. The computing device 100 may include at least two display devices 102, 104. The computing device 100 may be displayed in a vertical (e.g., portrait) orientation 202 or a horizontal (e.g., landscape) orientation 204. As a non-limiting example, in the vertical orientation 202, the first display device 102 may be on one side (e.g., the left side or the right side), the second display device 104 may be on another side (e.g., the right side or the left side), and the hinge 106 may join the first display device 102 to the second display device 104. Additional examples of the vertical orientation 202 are illustrated in FIG. 3. In the horizontal orientation 204, the first display device 102 may be located at the top (or the bottom) of the computing device 100 with the hinge 106 in the middle and the second display device 104 may be located at the bottom (or the top) of the computing device 100. Additional examples of the horizontal orientation 204 are illustrated in FIG. 4.

A bezel 206(1) may surround the first display device 102 and a bezel 206(2) may surround the second display device 104. The camera and the ambient light sensor (ALS) 162(1) may be embedded into the bezel 206(1) and the camera and the ALS 162(2) may be embedded into the bezel 206(2), as illustrated in FIG. 2.

FIG. 3 is a diagram 300 illustrating additional vertical orientations of a dual-display device according to some embodiments. Additional examples of the vertical orientation 202 may include a book orientation 302 and a vertical tablet orientation 304. As a non-limiting example, in a first book orientation 302(1), the first display device 102 may be on the left and the second display device 104 may be on the right. Alternately, in a second book orientation 302(2), the second display device 104 may be on the left and the first display device 102 may be on the right.

In the vertical tablet orientation 304, the first display device 102 may be on the left and the second display device 104 may be on the right. In a first vertical tablet orientation 304(1), if the first display device 102 is facing a user, then the second display device 104 may be rotated approximately 180 degrees, e.g., facing away from the user. If sensor data from the camera confirms that the user is not viewing the first display device 102, the logo may be displayed on the first display device 102. An intensity (e.g., a brightness) of the logo may be determined based on an amount of ambient light striking the first display device 102, as determined by sensor data from the ALS 162(1). As a non-limiting example, if the amount of ambient light is relatively low (e.g., relatively dark environment), then the logo may be displayed with a relatively low intensity. If the amount of ambient light is relatively high, (e.g., relatively bright environment) then the logo may be displayed with a relatively high intensity. If sensor data from the sensors indicates that the computing device 100 has been placed on a table (or another surface) with the second display device 104 facing down on the table (or other surface), then the logo may not be displayed.

In a second vertical tablet orientation 304(2), the second display device 104 may be facing the user while the first display device 102 may rotated approximately 180 degrees to face away from the user. In the vertical tablet orientation 304(2), sensor data from the camera may be used to determine that the user is not viewing the second display device 104. In response, the logo may be displayed on the second display device 104. An intensity (e.g., a brightness) of the logo may be determined based on an amount of ambient light striking the second display device 104, as determined by sensor data from the ALS 162(2). As a non-limiting example, if the amount of ambient light is relatively low (e.g., relatively dark environment), then the logo may be displayed with a relatively low intensity. If the amount of ambient light is relatively high, (e.g., relatively bright environment), then the logo may be displayed with a relatively high intensity. If sensor data from the sensors indicates that the computing device 100 has been placed on a table (or another surface) with the first display device 102 facing down on the table (or other surface), then the logo may not be displayed.

In 304(1), 304(2), if the user re-orients the computing device 100 to a horizontal orientation, e.g., by turning the computing device 100 about ninety degrees to either the right or the left, one or more of sensors 146, 148 (e.g., the gyroscopes 158, the magnetometer 159, or the like) of FIG. 1, may determine that the computing device 100 has been re-oriented and adjust the displayed logo accordingly. As a non-limiting example, if the sensors 146, 148 determine that the computing device 100 has been rotated (e.g., relative to a center of the computing device 100) about ninety degrees to the right, the logo may be rotated about ninety degrees to the right. If the sensors 146, 148 determine that the computing device 100 has been rotated (e.g., relative to a center of the computing device 100) about ninety degrees to the left, the logo may be rotated about ninety degrees to the left.

FIG. 4 is a diagram 400 illustrating additional horizontal orientations of a dual-display device according to some embodiments. Additional examples of the horizontal orientation 204 may include a tent orientation 402, a presentation orientation 404, a horizontal tablet orientation 406, and a clamshell orientation 408.

In 402(1), the first display device 102 may be at the top facing the user while the second display device 104 may be at the bottom facing away from the user. In 402(2), the second display device 104 may be at the top facing the user and the first display device 102 may be at the bottom facing away from the user. In the tent orientation 402(1), sensor data from the camera may be used to determine that the user is not viewing the first display device 102. In response, the logo may be displayed on the first display device 102. An intensity (e.g., a brightness) of the logo may be determined based on an amount of ambient light striking the first display device 102, as determined by sensor data from the ALS 162(1). As a non-limiting example, if the amount of ambient light is relatively low (e.g., relatively dark environment), then the logo may be displayed with a relatively low intensity. If the amount of ambient light is relatively high, (e.g., relatively bright environment). then the logo may be displayed with a relatively high intensity.

In 404(1), the first display device 102 may be at the top facing the user and the second display device 104 may be at the bottom facing down. In 404(2) the second display device 104 may be at the top facing the user and the first display device 102 may be at the bottom facing down. In the tent orientation 402(2), sensor data (e.g., image data) from the camera may be used to determine that the user is not viewing the second display device 104. In response, the logo may be displayed on the second display device 104. An intensity (e.g., a brightness) of the logo may be determined based on an amount of ambient light striking the second display device 104, as determined by sensor data from the ALS 162(2). As a non-limiting example, if the amount of ambient light is relatively low (e.g., relatively dark environment), then the logo may be displayed with a relatively low intensity. If the amount of ambient light is relatively high, (e.g., relatively bright environment). then the logo may be displayed with a relatively high intensity.

In 406(1), the first display device 102 may be facing the user and the second display device 104 may be facing away from the user. In the horizontal tablet orientation 406(1), sensor data from the camera may be used to determine that the user is viewing the first display device 102. In response, the logo may be displayed on the second display device 104. An intensity (e.g., a brightness) of the logo may be determined based on an amount of ambient light striking the second display device 104, as determined by sensor data from the ALS 162(1). As a non-limiting example, if the amount of ambient light is relatively low (e.g., relatively dark environment), then the logo) may be displayed with a relatively low intensity. If the amount of ambient light is relatively high, (e.g., relatively bright environment). then the logo may be displayed with a relatively high intensity. Based on sensor data from the sensors (e.g., gyro, magnetometer, or the like), if the computing device 100 determines that the computing device 100 has been placed on a surface (e.g., the user is not holding the computing device 100) with the second display device 104 facing down (e.g., towards the surface), then the logo may not be displayed on the second display device 104.

In 406(2), the second display device 104 may be facing the user and the first display device 102 may be facing away from the user. In the horizontal tablet orientation 406(2), sensor data from the camera may be used to determine that the user is viewing the second display device 104. In response, the logo may be displayed on the first display device 102. An intensity (e.g., a brightness) of the logo may be determined based on an amount of ambient light striking the second display device 104, as determined by sensor data from the ALS 162(2). As a non-limiting example, if the amount of ambient light is relatively low (e.g., relatively dark environment), then the logo may be displayed with a relatively low intensity. If the amount of ambient light is relatively high, (e.g., relatively bright environment). then the logo may be displayed with a relatively high intensity. Based on sensor data from the sensors (e.g., gyro, magnetometer, or the like), if the computing device 100 determines that the computing device 100 has been placed on a surface (e.g., the user is not holding the computing device 100) with the first display device 102 facing down (e.g., towards the surface), then the logo may not be displayed on the first display device 102.

In 406(1), 406(2), if the user re-orients the computing device 100 to a vertical orientation, e.g., by turning the computing device 100 about ninety degrees to either the right or the left, one or more of sensors 146, 148 (e.g., the gyroscopes 158, a magnetometer, or the like) of FIG. 1, may determine that the computing device 100 has been re-oriented and adjust the displayed logo accordingly. As a non-limiting example, if the sensors 146, 148 determine that the computing device 100 has been rotated (e.g., relative to a center of the computing device 100) about ninety degrees to the right, the logo may be rotated about ninety degrees to the right. If the sensors 146, 148 determine that the computing device 100 has been rotated (e.g., relative to a center of the computing device 100) about ninety degrees to the left, the logo may be rotated about ninety degrees to the left.

In 408(1), the first display device 102 may be at the top facing the user and the second display device 104 may be at the bottom facing the user (e.g., in a position where traditionally, a keyboard is located in a laptop). In 408(1), in some cases, a QWERTY-based keyboard may be displayed on the second display device 104 and used to receive keyboard input. In 408(2), the second display device 104 may be at the top facing the user and the first display device 102 may be at the bottom facing the user (e.g., in a position where traditionally, a keyboard is located in a laptop). In 408(2), in some cases, a QWERTY-based keyboard may be displayed on the first display device 102 and used to receive keyboard input.

Figure 5:
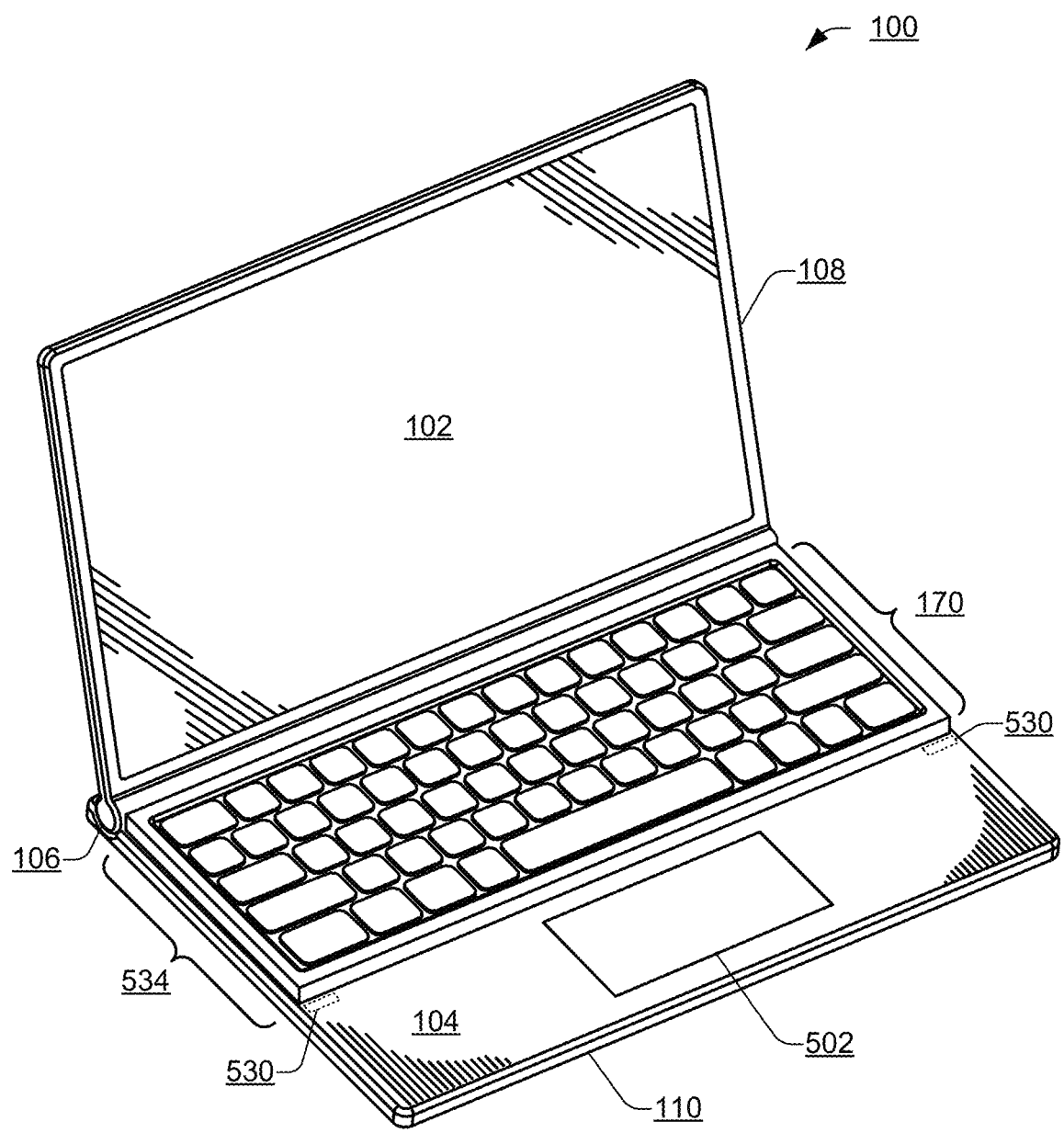
FIG. 5 is a perspective view of a keyboard device coupled to a dual-display computing device according to some embodiments.

FIG. 5 shows a perspective view 500 of the dual-display computing device 100 opened to a clamshell orientation 408 and having the keyboard 170 positioned on the second display device 104 of the dual-display computing device 100. The first display device 102 of the dual-display computing device 100 may display text and graphics. The second display device 104 may provide backlighting to the keyboard 170. A portion 502 of the second display device 104 may be used as a specialized input area, such as a trackpad, a numeric keypad, application specific commands, a gaming controller, or the like. While the portion 502 is sometimes referred to herein as trackpad 502, it should be understood that a user may configure the portion 502 to provide different functions depending on the application being used in the foreground. For example, for an accounting application, the portion 502 may be configured as a numeric keypad, for a gaming application, the portion 502 may be configured to include game specific commands, and so on.

Although the keyboard 170 is described herein being placed on the second display device 104, it should be understood that the dual-display computing device 100 may, in some cases, be re-oriented such that the second display device 104 is viewed by the user and the keyboard 170 is placed on the first display device 102. The dual-display computing device 100 refers to any device with at least two display devices. As described herein, the keyboard 170 may be placed on a particular display device of the at least two display devices.

The keyboard 170 may be portable and use a wireless technology to communicate (e.g., exchange signals with) the computing device 100. Portable refers to the ability of the keyboard 170 to be physically small and light weight such that it may be easily carried by the user. Wireless refers to the ability of the keyboard 170 to be wirelessly operable within a predetermined distance (e.g., 1 meter) from the dual-display computing device 100. For example, the keyboard 170 and the dual-display computing device 100 may exchange communications (e.g., commands, data, and the like) via Bluetooth, near field communications (NFC), Zigbee, infrared beaming, or another type of wireless communication protocol (e.g., without being connected by a cable).

In some cases, a keyboard image may be displayed on the second display device 104 when the dual-display computing device 100 is in the clamshell orientation 408. In such cases, touch input detected on the second display device 104 may be converted to virtual keystrokes. However, the user may, in some cases, prefer the touch and feel of a physical keyboard, such as the keyboard 170.

Though the keyboard 170 is a distinct and separate device from the dual-display computing device 100, the keyboard 170 may operate in conjunction with the dual-display computing device 100 and may be positioned on one of the display devices 102, 104, such as, the second display device 104, as illustrated in FIG. 5. The keyboard 170 may be relocated from the display devices 102, 104 such that the keyboard 170 is not in contact with any portion of the computing device 100. Even when relocated, the keyboard 170 may continue to provide input to the dual-display computing device 100. In some embodiments, the keyboard 170 may be moved up to one meter away from the dual-display computing device 100 while remaining communicatively coupled to the computing device 100. Of course, when the keyboard 170 is not in contact with the either of the display devices 102, 104, the keyboard 170 may not benefit from backlighting provided by one of the display devices 102, 104.

The keyboard 170 may be temporarily held in place on the second display device 104 by one or more keyboard retainers 530. The one or more keyboard retainers 530 may couple the keyboard 170 to the dual-display computing device 100 and may align the keyboard 170 to one or more predesignated positions 534 on the second display device 104. For example, an individual keyboard retainer selected from the one or more keyboard retainers 530 may include (i) a mechanical matching of the keyboard 170 to the dual-display computing device 100, (ii) a magnetic attraction between a magnet or metal component of the keyboard 170 and a magnet or metal component of the dual-display computing device 100, (iii) the alignment of a depression on the keyboard 170 with a projection of the dual-display computing device 100 or vice versa, or combinations thereof.

In some cases, the keyboard 170 may couple to the second display device 104 in one of multiple positions. The dual-display computing device 100 may automatically determine (i) the presence of the keyboard 170 and (ii) the particular position of the keyboard 170 on one of the display devices 102, 104. Based on the particular position, the computing device 100 may adjust what is being displayed (e.g., adjust a location of the backlight area and a location of the trackpad area) on the second display device 104. For example, the keyboard 170 may couple to one of the display devices 102, 104 with a first (e.g., front) edge of the keyboard 170 near the hinge 106. As another example, the keyboard 170 may couple to the one of the display devices 102, 104 in a position where a second (e.g., rear) edge of the keyboard is furthest from the hinge 106, as described in more detail in FIG. 10.

The keyboard 170 may provide multiple options for backlighting the keys on the keyboard 170. One of the multiple options may be selected based on an amount of ambient light falling on the keyboard 170, a battery level of a battery of the computing device 100, a battery level of the batteries in the keyboard 170, or any combination thereof.

A first option may include not providing a backlight to the keys. The first option may be selected when the keyboard 170 is used in a well-lit environment where backlighting the keys would not make a perceivable difference. Since the first option does not draw energy from batteries in the keyboard, the first option may be relatively energy efficient and prolong the battery life of the keyboard 170. If the batteries are not used to power backlights within the keyboard 170, the life of the batteries may be extended, enabling the batteries to power the keyboard 170 for several weeks or even several months (e.g., between 1 month to 6 months). When rechargeable batteries are used to power the keyboard 170, attaching the keyboard 170 to the computing device 100 using a USB cable may enable the keyboard to charge the batteries via USB.

A second option may include using lights that are internal to the keyboard 170 to backlight the keys. The internal lights may be powered by the keyboard's internal batteries (e.g., the batteries 184 of FIG. 1). Because the internal lights use energy from the keyboard's internal batteries, the second option is less energy efficient as it relates to the battery life of the keyboard 170. When the keyboard's internal batteries are used to power backlights within the keyboard 170, the battery life of the keyboard's internal batteries may be a reduced to a period of time such as several hours (e.g., between 6 to 12 hours).

A third option may include using a light source that is external to the keyboard 170 to provide a backlight to the keys. For example, one of the display devices 102, 104 may be used as a light source external to the keyboard 170 to backlight the keys. Because the third option does not use the keyboard's internal batteries to backlight the keyboard 170, the third option may be as energy efficient as the first option in terms of the battery life of the batteries in the keyboard 170. The third option is described in more detail herein (e.g., FIG. 6 and FIG. 11).

Using an ALS (e.g., the ALS 162(1) or 162(2) of FIG. 1) located within the dual-display computing device 100, software executing on the dual-display computing device 100 may monitor the ambient light level and dim the backlighting of the keyboard 170 in bright environments (e.g., in which an ambient light level satisfies a predetermined threshold). In addition, when the keyboard 170 is positioned on (and backlit by) the second display device 104, the software may dim the backlighting of the keyboard 170 by reducing an intensity of the backlight provided by the second display device 104 or by changing what is being displayed on the second display device 104 under each key.

In some cases, the keyboard 170 may occupy less than the total surface area of the second display device 104. For example, when the keyboard 170 is positioned on a portion (e.g., three-fifths) of the second display device 104 that is closest to the hinge 106, then a remaining portion (e.g., two-fifths) of the second display device 104 closest to the user may be accessible (and visible) to the user. Because the second display device 102 is touch sensitive, the exposed display area may be touch-sensitive. In some cases, the software executing on the dual-display computing device 100 may disable the remaining portion of the second display device 104 to prevent false triggering or accidental input. In other cases, the software executing on the dual-display computing device 100 may enable the second display device 104 to accept touch inputs via the remaining area of the second display device 104. For example, the software may use the accessible (e.g., remaining) portion of the second display device 104 to provide a touch-input area, such as a trackpad, a numeric keypad, application-specific shortcut keys, or the like. To illustrate, the touch-input area may provide shortcut keys for commonly used commands in a particular application, including productivity applications (e.g., Office suites), gaming applications, and the like.

The dual-display computing device 100 may determine the presence of the keyboard 170 on one of the display devices 102, 104 to enable the software executing on the dual-display computing device 100 to manage the keyboard backlight by selecting a particular option of the previously described options. For example, a presence of the keyboard 170 may be determined using one or more electrical contacts between the dual-display computing device 100 and the keyboard 170, a micro switch (e.g., a protrusion on a bottom of the keyboard 170 may cause a micro switch in an indent on the bezel of one of the display devices 102, 104 to be closed), an optical sensor, an ultrasonic sensor, an inductive or capacitive proximity sensor, a magnetic field sensor, or any combination thereof. In some cases, a magnet within the keyboard 170 may be sensed by the computing device 100 using a Hall-effect sensor (or other magnetically sensitive sensor) located within the computing device 100. For example, when the keyboard 170 is placed on one of the display devices 102, 104, the magnet in the keyboard 170 may be within a predetermined distance (e.g., 3 centimeters (cm) or less) of a Hall-effect sensor (e.g., the sensor 160(1) or 160(2) of FIG. 1), causing the computing device 100 to determine the presence of the keyboard 170.

In some cases, e.g., when the keyboard 170 may be coupled at one of multiple positions on the second display device 104, two or more sensors in the computing device 100 may be used to determine not only the presence of the keyboard 170 but also the specific position of the keyboard 170.

The keyboard 170 may include a wireless transceiver for communication with the dual-display computing device 100. For example, the keyboard 170 and the dual-display computing device 100 may exchange commands and information via Bluetooth, NFC, infrared beaming, or other wireless communication links and protocols in lieu of cables. Communication from the keyboard 170 to the dual-display computing device 100 may include, for example, information associated with key depression and key releases, ambient light sensor readings, keyboard battery level information, and other keyboard-related information, as described herein. Communication from the dual-display computing device 100 to the keyboard 170 may include, for example, commands to enable, disable, or change the intensity of the internal keyboard backlight, and other commands, as described herein.

The keyboard 170 may be powered by one or more batteries located in the keyboard 170. The one or more batteries may be rechargeable and/or replaceable. The one or more batteries may power a controller (e.g., keyboard controller) that monitors and communicates keystrokes, provides a backlight to the keys, and communicates wirelessly with the dual-display computing device 100. The controller may be implemented in hardware, software, or a combination thereof.

The keyboard 170 may include a battery sensor for determining a battery level of the one or more batteries. The term battery level refers to a percentage of battery charge remaining in the one or more batteries. The battery level may be determined as a percentage between 0 percent (corresponding to a fully discharged battery) and 100 percent corresponding to a fully charged battery. The battery level sensor may provide battery level data to the controller within the keyboard 170. The controller may provide the battery level data to the dual-display computing device 100. When the dual-display computing device 100 is not located on the second display device 104, the controller may reduce or disable the internal keyboard backlight when the battery level drops below a predetermined battery charge threshold (e.g., 10%, 20%, 30%, or the like). For example, the controller may reduce a level of the internal backlight when the battery level satisfies a first threshold (e.g., <=30%) and disable the internal backlight when the battery level satisfies a second threshold (e.g., <=10%). Reducing and/or disabling the keyboard internal backlights may prolong the life of the batteries to enable the keyboard 170 to continue to be used for a longer period of time.

The keyboard 170 may include an ambient light sensor (ALS) for determining the level of ambient lighting. The ALS in the keyboard 170 may provide the ambient light level to the controller in the keyboard 170 and the controller may provide the ambient light level to the dual-display computing device 100. When the keyboard 170 is not placed on one of the display devices 102, 104, the controller may disable the internal keyboard backlights when the ambient light level is above a predetermined ambient light threshold. Disabling the internal keyboard backlights in a high ambient light level environment may prolong the battery life by not incurring the power drain power caused by the backlights.

In addition to enabling or disabling the internal keyboard backlights, the ambient light level determined by the ALS may be used to adjust (e.g., dim or brighten) the internal keyboard backlights according to the ambient lighting conditions. In addition to providing an improved user experience, adjusting a brightness level of the internal keyboard backlights according to ambient lighting conditions may prolong keyboard battery life.

Thus, the keyboard 170 may be coupled to one of the display devices 102, 104 of the dual-display computing device 100. The keycaps 702 of the keyboard 170 may be backlit (i) using backlights internal to the keyboard 170 or (ii) from an external light source (e.g., external to the keyboard), such as one of the display devices 102, 104. The backlight provided by the external source may conserve battery power and increase battery life for the battery in the keyboard 170, enabling the keyboard 170 to be used for a longer period of time.

The keyboard 170 may be temporarily attached to one of the display devices 102, 104 using a coupling mechanism between the keyboard 170 and the dual-display computing device 100. For example, the coupling between the keyboard 170 and the dual-display computing device 100 may use a combination of (i) magnets or (ii) magnets and metal plates. For example, the keyboard 170 may include magnets and the computing device 100 may include magnets or metal plates. As another example, the computing device 100 may include magnets and the keyboard 170 may include magnets or metal plates. In some cases, the magnets in the computing device 100 may be a permanent magnet or an electro-magnet that is under software control.

An ambient light sensor (ALS) in the keyboard 170 may provide information that enables software executing in the computing device 100 to determine whether the keycaps 702 should be backlit (e.g., illuminated) and an intensity of the illumination. The dual-display computing device 100 may determine the presence of the keyboard 170 and adjust the display device on which the keyboard 170 has been placed to provide an external backlight to the keyboard 170. When using the internal keyboard backlights, the keyboard 170 may use data provided by a battery sensor to determine whether to use the internal backlights and if used, an intensity of the internal backlights.

Figure 6:
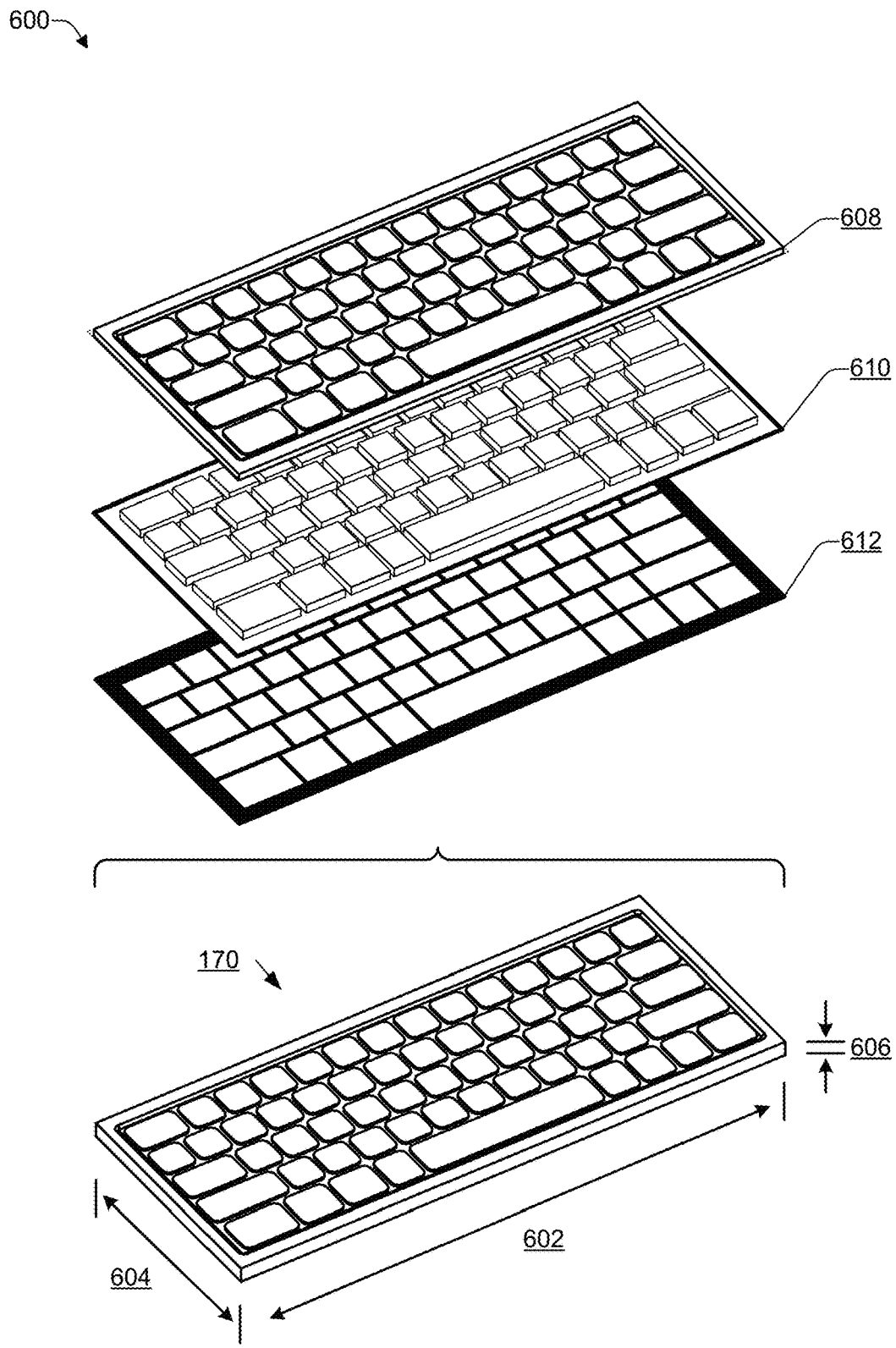
FIG. 6 is an exploded view illustrating layers within the dual-display computing device that may have optical significance when an external light source provides backlighting for the keycaps on the keyboard device.

FIG. 6 illustrates an exploded view 600 of various layers of the keyboard 170. The keyboard 170 includes a keyboard enclosure. A length 602 of the keyboard 170 may be less than or equal to a widest dimension of each of the display devices 102, 104. A width 604 of the keyboard 170 may be less than or equal to a narrowest dimension of each of the display devices 102, 104. In some cases, the width 604 of the keyboard 170 may be one-half to two-thirds of the narrowest dimension of the second display device 104 to enable a remainder of one of the display devices 102, 104 to be used as the trackpad 502. In some cases, the width 604 of the keyboard 170 may match the narrowest dimension of the second display device 104 such that the entire display device is covered by the keyboard 170. In some cases, the width 604 of the keyboard 170 may be no more than one half of the narrowest dimension of one of the display devices 102, 104, allowing a portion of one of the display devices 102, 104 to be used to display content while enabling the keyboard to be used on a remaining portion of the display device. A height 606 of the keyboard 606 may be fairly thin (e.g., between about 1 millimeter (mm) to about 100 mm) to enable a user to view the first display device 102.

A bottom layer of the keyboard 170 may comprise a light separating mask 612. The light separating mask 612 may be a transparent panel with an opaque mask coupled to the transparent panel. The pattern of the opaque mask may correspond to the placement of keys on a keyboard assembly 608 that is located above the light separating mask 612. The pattern of the opaque mask may provide an opaque border around key borders while the center of each key remains open and therefore transparent. The light separating mask 612 allows light from the second display device 104 to travel directly upwards towards a specific key while reducing the amount of light that reaches the specific key from a neighboring portion of the second display device 104. In some cases, the transparent panel and the opaque mask may be two separate components that are combined to form the light separating mask 612.

A middle layer of the keyboard 170 may include a lensing system 610. The pattern of the lensing system 610 may correspond to the placement of keys on the keyboard assembly 608 that is located above the lensing system 610. The pattern of the lensing system 610 may provide one or more lensing elements for each backlit key on the keyboard 170. The one or more lensing elements for any individual key may be located between the keycap of the key and the portion of the second display device 104 located directly below the key. The lensing system 610 may redirect the light from the second display device 104 to focus the light onto a point or area on a keycap 702 of the key. For example, the one or more lensing elements may have a plano-convex shape, a plano-concave shape, or another type of geometric shape. Each lensing element of the lensing system 610 may include a Fresnel lens, a cylindrical lens, a lenticular lens, or combinations thereof.

A top layer of the keyboard 170 may include a keyboard assembly 608. The keyboard assembly 608 may include, for example, a keyboard controller and, for each of a plurality of keys, a keycap, a return mechanism, a press sensing mechanism, and one or more key backlights. The keyboard controller may detect depressions and releases of the keys and report them to an external device, such as the computing device 100 of FIG. 1. The return mechanism may cause the keycap to return to a resting position after each depression. The press sensing mechanism may detect the depression and release of each key. The one or more key backlights may provide illumination for each key from within the keyboard 170. The keycap of each key of the keyboard 170 may include a translucent or transparent area to enable a backlight to illuminate each key.

Each backlit key on the keyboard 170 may include voids (e.g., void areas) where light may pass from the second display device 104 to the lensing system 610 located below each key and from the lensing system 610 to each keycap. In some cases, portions of the return mechanism may be fabricated from transparent materials to increase the transparent properties of each key.

Thus, the keyboard 170 may include multiple layers to provide a conventional keyboard functionality and to control the path of illumination from an external light source when backlighting the keycaps 702 from the external light source, such as one of the display devices 102, 104.

Figure 7:
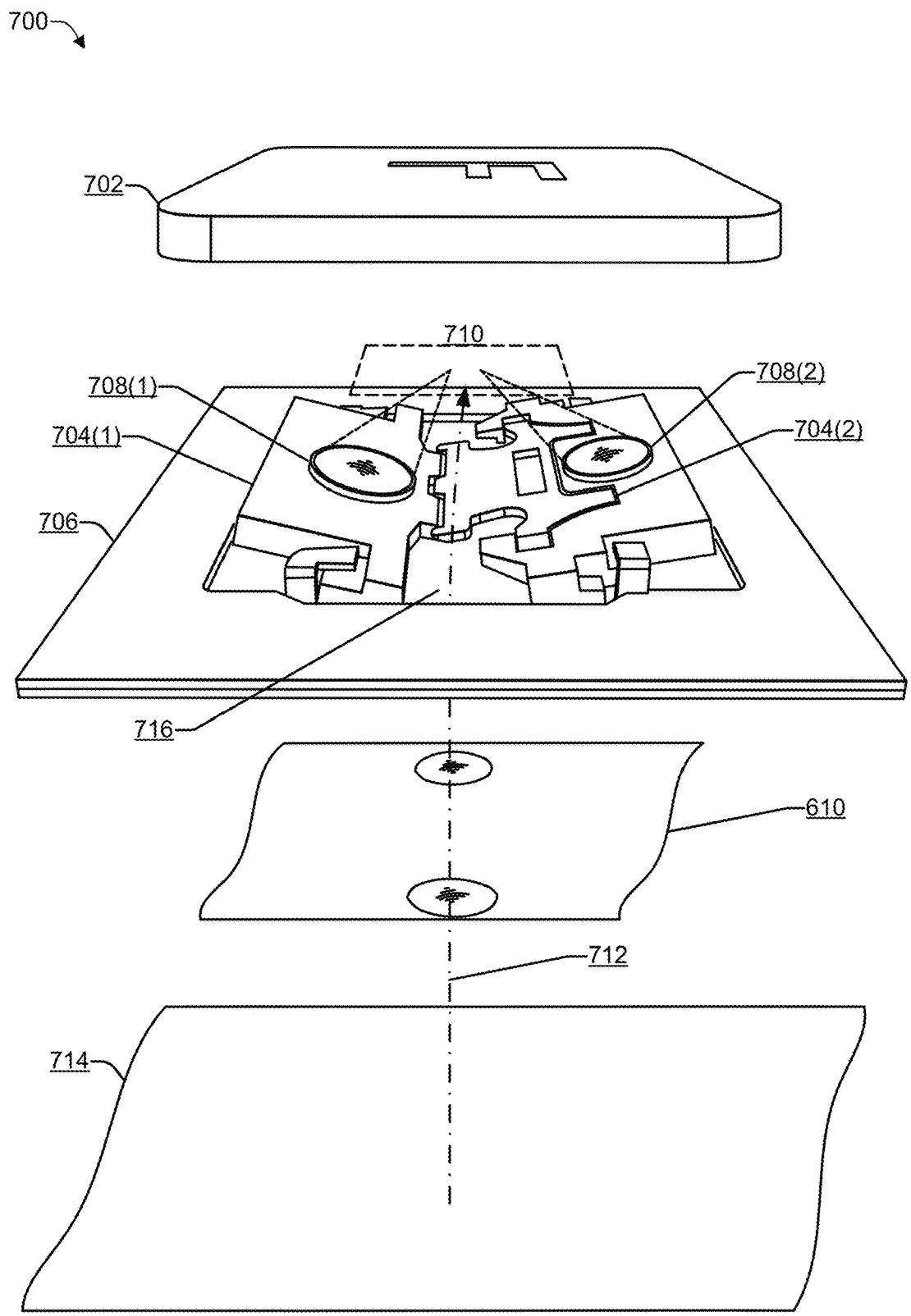
FIG. 7 is a detail diagram of a key mechanism with internal and external backlighting according to some embodiments.

FIG. 7 is a diagram illustrating a key mechanism 700 according to some embodiments. For example, each of the keys of the keyboard 170 of FIG. 1 may use a mechanism similar to the key mechanism 700. A keycap 702 (e.g., the character 'F' is used for illustration purposes in FIG. 7) may be placed above a butterfly mechanism 704. The butterfly mechanism 704 may lift the keycaps 702 due to magnetic repulsion. When a user applies an amount of pressure that is greater than a predetermined amount to the keycap 702, the butterfly mechanism 704 may move from a first height to a second height (e.g., that is lower than the first height), and cause the keyboard 170 of FIG. 1 to register a key press of a particular key (e.g., the 'F' key is illustrated in FIG. 7).

As illustrated in FIG. 7, the key may include two key backlights 708(1), 708(2) which may be integrated with (e.g., attached to) the butterfly mechanism 704. Of course, in some cases, less than two key backlights (e.g., one key backlight) or more than two key backlights (e.g., three key backlights, four key backlights, or the like) may be integrated into the butterfly mechanism 704. The plurality of key backlights 708 for all of the keys 700 on the keyboard 170 may be referred to collective as the keyboard backlight or the keyboard backlights.

In some cases, the plurality of key backlights 708 may include lenses to focus the backlight onto one or more specific areas 710 of the keycap 702. For example, the key backlights 708 may illuminate the alphanumeric character or symbol on the keycap 702 (the letter "F" in FIG. 7).

The base 706 of each individual key 700, may include one or more open areas 716 devoid of material or components. Light originating from an external light source 714 located below the key 700 may travel (e.g., shine) through one or more unobstructed pathways 712 to illuminate the keycap 702, as an alternative to using the key backlights 708. The one or more unobstructed pathways 712 may include transparent material such as, for example, a light separating mask 612 or a lensing system 610 or one or more open areas 716. Using the external light source 714 to illuminate the key 700 and turning the key backlights 708 off may result in prolonging a battery life of the keyboard 170 when the external light source 714 is used.

Thus, the keys 700 on the keyboard 170 may be backlit (e.g., illuminated). When backlit, the source of the illumination may be the key backlights 708 that are located within the key 700 or the external light source 714. The external light source 714 may be used when available to increase the keyboard's battery life and enable the keyboard 170 to be used for a longer period of time as compared to using the internal backlights powered by the keyboard's battery.

Figure 8:
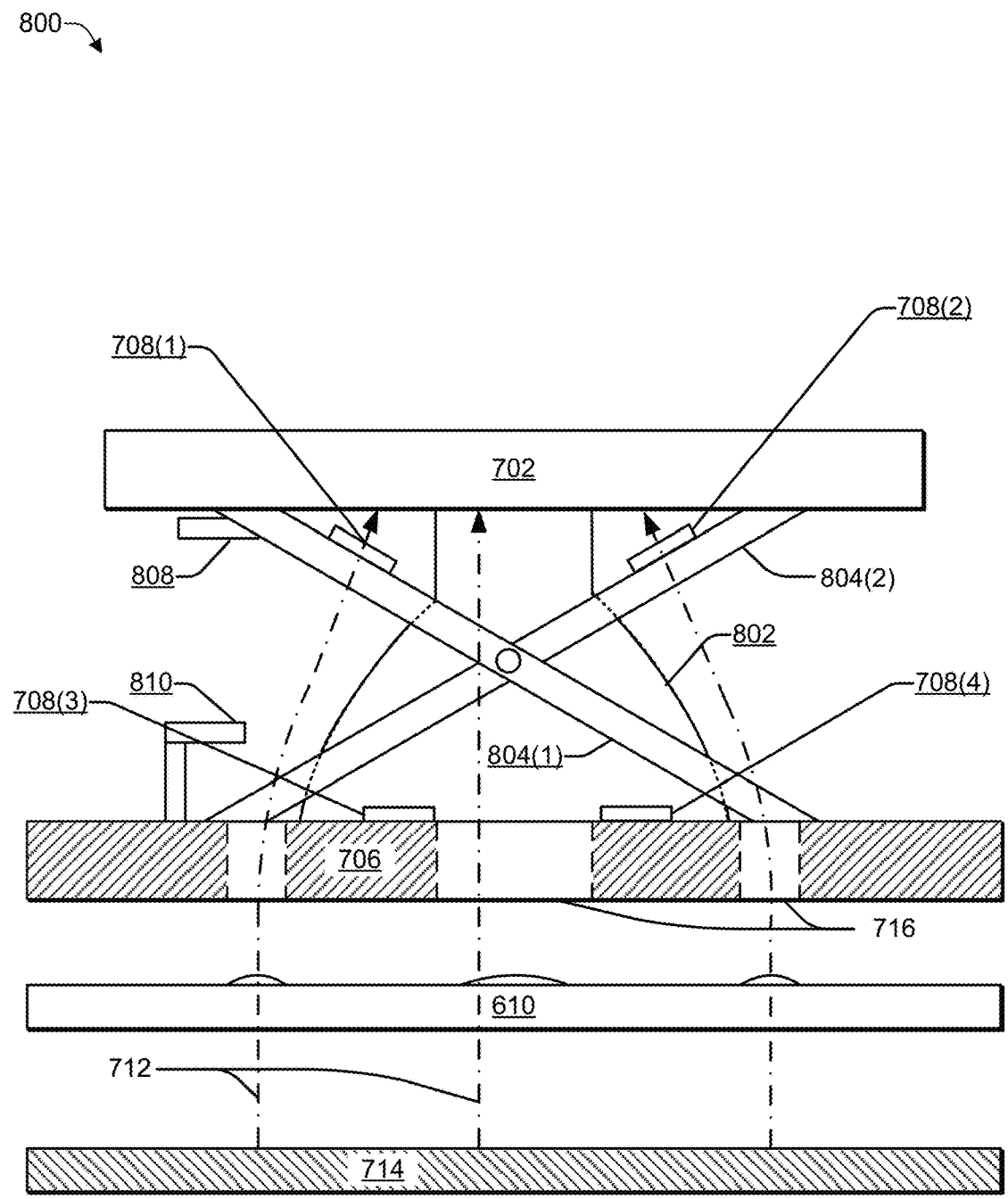
FIG. 8 a detail diagram of an alternative key mechanism with internal and external backlighting according to some embodiments.

FIG. 8 is a diagram 800 illustrating an alternate key mechanism 800 that includes multiple backlight options according to some embodiments. The keys are attached to the keyboard 170 of FIG. 1 via two pieces 804(1) and 804(2) that interlock similar to a pair of scissors. A dome 802 may serve as a spring to lift the keycap 702.

The key mechanism illustrated in FIG. 8 shows a first portion 810 of a switch that is part of the base 706 and a second portion 808 of the switch that is part of the scissor mechanism 804. FIG. 8 shows the scissor mechanism when the keycap 702 is not depressed. When the keycap 702 is depressed, switch parts 808, 810 may come into contact with or into proximity to each other to signal a key depression.

As illustrated in FIG. 8, the key may comprise one or more key backlights 708(1), 708(2), 708(3), 708(4) which may be integrated with (e.g., attached to) the scissor mechanism 804. In some cases, the key backlights 708 may include lenses to focus the backlight onto specific areas of the keycap 702.

The base 706 of each individual key 800, may include one or more open areas 716 ("voids") that are devoid of material or components. When an external light source 714 (e.g., one of the display devices 102, 104) is being used, light originating from the external light source 714 located below the key 800 may travel through one or more unobstructed pathways 712 to illuminate the keycap 702. Alternately, if the external light source 714 is not being used, the key backlights 708 located within the key 800 may be used to illuminate the keycap 702. The one or more unobstructed pathways 712 may include transparent material such as, for example, a light separating mask 612, a lensing system 610, one or more open areas 716, or any combination thereof. Using the external light source 714 to illuminate the key 800 and turning the key backlights 708 off may result in a substantial extension of the battery life of the keyboard 170 of FIG. 1 when the external light source 714 is available.

Thus, each key 800 of the keyboard 170 may be illuminated using (i) the key backlights 708 that are internal to the key 800 (e.g., powered by batteries in the keyboard 170) or (ii) the external light source 714 (e.g., one of the display devices 102, 104). Using the external light source 714 may enable the key backlights 708 to be unused, thereby prolonging the battery life of batteries in the keyboard 170. In this way, the user can use the keyboard 170 for a longer period of time while enjoying the experience of using backlit keys.

Figure 9:
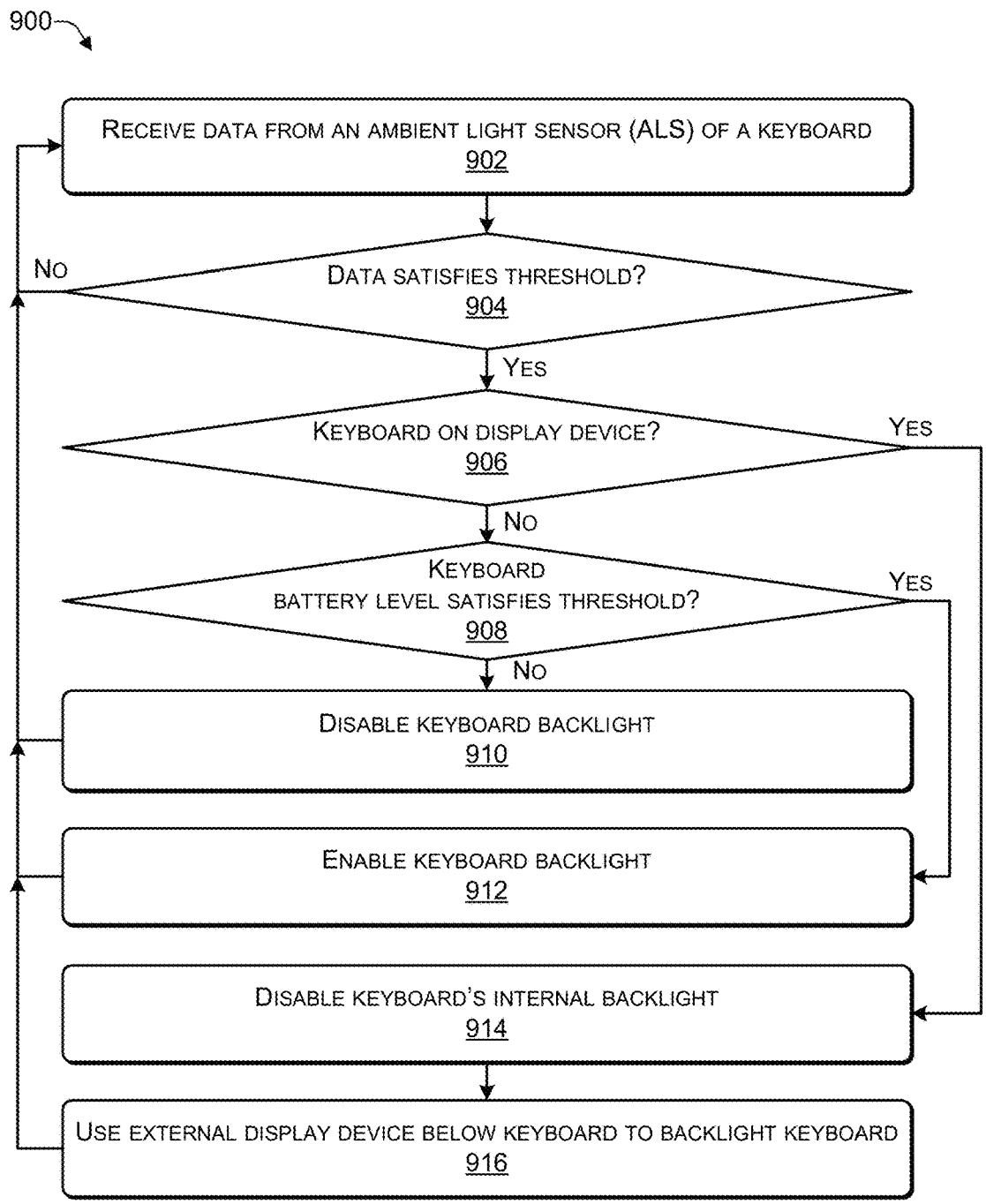
FIG. 9 is a flowchart of a process that manages the battery life of a keyboard device according to some embodiments.

In the flow diagram of FIG. 9, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the process 900 is described with reference to FIGS. 1, 2, 3, 4, 5, 6, 7, and 8, as described above, although other models, frameworks, systems and environments may be used to implement this process.

FIG. 9 is a process 900 that includes enabling a keyboard backlight based on various conditions. The process 900 may be performed by hardware and/or software located within a keyboard 170, within the dual-display computing device 100 of FIG. 1 or a combination thereof. For example, a controller within the keyboard 170 may directly control the internal backlights, including turning the internal backlights on and off and modifying (e.g., adjusting) a brightness of the internal backlights. The computing device 100 may wirelessly communicate with the keyboard 170 to instruct the keyboard to turn the internal backlights on or off, modify the brightness of the internal backlights, display a trackpad (or other input area), modify a color of one or more keys, or the like.

At 902, ambient light data from ambient light sensor (ALS) associated with a keyboard may be received. At 904, a determination may be made whether the ambient light data satisfies an ambient light threshold (e.g., is the environment dimly lit). If a determination is made that "yes" the ambient light data satisfies the ambient light threshold (e.g., the environment is dimly lit), then the process may proceed to 906. If a determination is made that "no" the ambient light data does not satisfy the ambient light threshold (e.g., environment is brightly lit), then the process may proceed to 902, where additional data may be received from the ALS. For example, in FIG. 1, the computing device 100 may receive ambient light data from at least one of the ALS 162(1), 162(2). The computing device 100 may determine, based on the ambient light data, whether the ambient light in an external environment satisfies an ambient light threshold, indicating that the environment is dimly lit. If the computing device 100 determines that the environment is dimly lit, then the computing device 100 may determine whether an external backlight or an internal backlight can be used to backlight the keys. If the computing device 100 determines that the environment is not dimly lit (e.g., the environment is brightly lit), then the computing device 100 may continue to monitor the data provided by the ALS 162.

At 906, a determination may be made whether the keyboard has been placed on a display device (e.g., an external light source). If a determination is made, at 906, that "yes" they keyboard has been placed on the display device, then the process may proceed to 914 (e.g., where the external light source may be used as a backlight). If a determination is made, at 906, that "no" the keyboard has not been placed on the display device, then the process may proceed to 908 (e.g., where the internal backlight may be used if the internal batteries have at least a predetermined battery level). For example, in FIG. 5, if the computing device 100 determines that the keyboard 170 has been placed on the display device 104, then the computing device 100 may instruct the keyboard 170 to turn off (or not turn on) the internal backlight and may configure the display device 104 to provide a backlight to the keyboard 170 and, in some cases, a specialized input area 502 (e.g., for a trackpad or other specialized keys).

At 908, a determination may be made whether the keyboard's battery level satisfies a predetermined battery level. If a determination is made, at 908, that "yes" the keyboard's battery level satisfies the predetermined battery level (e.g., battery level is N % or greater, where N=20, 30, 40 or the like), then the process may proceed to 912, where the keyboard's internal backlight is enabled, and the process may proceed to 902. If a determination is made, at 908, that "no" the keyboard's battery level does not satisfy the predetermined battery level (e.g., battery level is less than N %), then the process may proceed to 910, where the keyboard's internal backlight is disabled, and the process may proceed to 902. For example, in FIG. 5, if the computing device 100 determines that the keyboard 170 in not located on either of the display devices 102, 104, then the computing device 100 may determine a battery level of a battery in the keyboard 170. If the battery level is greater than a predetermined amount (e.g., 30%, 40%, 50% or the like), then the computing device 100 may instruct the keyboard 170 to turn on the internal backlight. If the battery level is less than or equal to the predetermined amount (e.g., 30%, 40%, 50% or the like), then the computing device 100 may instruct the keyboard 170 to not turn on (or turn off) the internal backlight. In some cases, such as in a dimly lit environment, if the keyboard's battery level is below the predetermined threshold and the internal backlight is currently not being used, the user may manually turn on the internal backlight. In response, the computing device 100 may display a warning message indicating that the keyboard's battery level is low and providing one or more recommendations. For example, the recommendations may include suggesting that (i) the user obtain new batteries or (ii) the keyboard be connected to the computing device using a cable (e.g., USB cable) to enable the computing device to power the keyboard (and recharge the batteries in the keyboard if the batteries are rechargeable).

At 914, the keyboard's internal backlight may be disabled. At 916, the external display device located below the keyboard may be used to backlight the keyboard, and the process may proceed to 902. For example, in FIG. 5, if the computing device 100 determines that the keyboard 170 has been placed on the display device 104, then the computing device 100 may instruct the keyboard 170 to turn off (or not turn on) the internal backlight and may configure the display device 104 to provide a backlight to the keyboard 170 and, in some cases, a specialized input area 502 (e.g., for a trackpad or other specialized keys).

Thus, a keyboard may be backlit using a variety of systems and techniques as described herein. For example, the keyboard may include an internal backlight that is powered by batteries internal to the keyboard. The keyboard may be capable of using an external light source (e.g., one of the display devices 102, 104) to backlight the keys. If ALS data indicates that the keyboard has been placed in a dimly lit environment, the keys may be backlit to improve the user's typing experience. If the keys are to be backlit due to a dimly lit environment and the keyboard is determined to have been placed on an external light source (e.g., one of the display devices 102, 104), then the external light source may be used and the internal backlight may not be used. In this way, the length of time that the keyboard can be powered by the keyboard's internal batteries may be increased. If the keys are to be backlit due to a dimly lit environment and the keyboard is not located on an external light source, then the internal backlight may be used if the keyboard's battery level is above a predetermined threshold (e.g., 10%, 20%, 30% or the like). In some cases, in a dimly lit environment, if the keyboard's battery level is below the predetermined threshold and the internal backlight is not used, the user may override the "internal backlight off" setting to turn on the internal backlight. In response, the computing device may display a warning message indicating that the keyboard's battery level is low and providing one or more recommendations. For example, the recommendations may include obtaining new batteries, connecting the keyboard to the computing device using a cable (e.g., USB cable) to enable the computing device to power the keyboard (and recharge the batteries in the keyboard if the batteries are rechargeable), and the like.

FIG. 10 is a detail view 1000 illustrating various techniques that may be employed to retain a keyboard 170 on a dual-display computing device 100. The keyboard 170 may be temporarily attached to the dual-display computing device 100 using mechanical latches, alignment of mechanical features, friction pads, gravity, magnetism, hook and loop fasteners, another type of retention technique, or combinations thereof.

FIG. 10A illustrates one of a plurality of mechanical latches that may couple the keyboard 170 to the dual-display computing device 100. At each latch location, a spring-loaded latch 1002 may exit the keyboard 170 via a keyboard latch aperture 1004. The spring-loaded latch 1002 may enter the dual-display computing device 100 via a laptop latch aperture 1008. Inside the dual-display computing device 100, the spring-loaded latch 1002 may grasp a peg 1006 and hold the keyboard 170 onto the dual-display computing device 100. To remove the keyboard 170 from the dual-display computing device 100, a user may press a release 1010 to displace the spring-loaded latch 1002 and free the spring-loaded latch 1002 from the peg 1006.

FIG. 10B illustrates one of a plurality of alignment features that the keyboard 170 and the dual-display computing device 100 may employ to retain the keyboard 170 in a particular position. A shaped protrusion 1012 on the keyboard 170 may seat into a shaped indentation 1014 on the dual-display computing device 100. The shaped protrusion 1012 and the shaped indentation 1014 may be complementary shapes and sizes such that the shaped protrusion 1012 fits within the shaped indentation 1014. Note that, in some cases, the shaped protrusion 1012 and the shaped indentation 1014 may be reversed, with the shaped protrusion 1012 on the dual-display computing device 100 and the shaped indentation 1014 on the keyboard 170.

FIG. 10B illustrates that a magnetic field sensor 1024 (lower) located in the dual-display computing device 100 may sense the proximity of a magnet 1016 (upper) located in the keyboard 170 to detect the presence of the keyboard 170 above a display panel 1020. For example, the magnetic field sensor 1024 may be a Hall-effect sensor or similar sensor.

FIG. 10C illustrates one of a plurality of magnetic retainers that the keyboard 170 and the dual-display computing device 100 may use to retain the keyboard 170 in one or more positions. The upper magnet 1016 in the keyboard 170 may attract a lower magnet 1018 in the dual-display computing device 100, thereby pulling the keyboard 170 and the dual-display computing device 100 together to align the keyboard 170 with the dual-display computing device 100. In some cases, the upper magnet 1016 and the lower magnet 1018 may be permanent magnets, such as, for example, rare-Earth magnets. The magnetic retainer may be used for the dual-display computing device 100 when the display panel 1020 (e.g., one of the display devices 102, 104 of FIG. 1) covers a large portion (50% or more) of the top surface of the dual-display computing device 100 and does not allow room for mechanical latches or other alignment features.

Also illustrated in FIG. 10C are an upper magnet sensor 1022 located in a keyboard 170 and a lower magnet sensor 1024 located in a dual-display computing device 100. The lower magnet sensor 1024, the upper magnet sensor 1022, or both may be used for detection of the presence of the keyboard 170 on a display panel 1020 of the dual-display computing device 100. The upper magnet sensor 1022, if present, may allow the keyboard 170 to sense the proximity of a lower magnet 1018 to determine that the keyboard 170 is located on the display panel 1020. The lower magnet sensor 1024, if present, may allow the dual-display computing device 100 to determine the proximity of an upper magnet 1016 to determine that the keyboard 170 is in position on the display panel 1020. in cases where only the upper magnet sensor 1022 or only the lower magnet sensor 1024 is provided, the device capable of detecting the presence of the keyboard 170 on the display panel 1020 may communicate such status to the other device. For example, if only the upper magnet sensor 1022 is provided, the keyboard 170 may determine that the keyboard 170 is positioned on the display panel 1020 and may communicate this information to the dual-display computing device 100. If only the lower magnet sensor 1024 is provided, the dual-display computing device 100 may determine that the keyboard 170 is positioned on the display panel 1020 and may communicate this information to the keyboard 170.

The techniques illustrated in FIG. 10 may be used in conjunction with each other. For example, the magnets of FIG. 10C may be combined with shaped protrusions 1012 and shaped indentations 1014 of FIG. 10B. In this example, the magnets may be used to detect the presence or absence of the keyboard 170 while the protrusions 1012 and indentations 1014 may be used to temporarily hold the keyboard in a particular position. Alternately, the magnets may be located in the protrusions 1012 and in the indentations 1014 to temporarily hold the keyboard in a particular position and enable detection of the presence or absence of the keyboard 170. As yet another alternative, the magnets may be used to temporarily hold the keyboard in a particular position while the protrusions 1012 or the indentations 1014 may include a microswitch that is activated when the protrusions are placed in the indentations, causing the computing device 100 to detect the presence of the keyboard 170.

Figure 11:
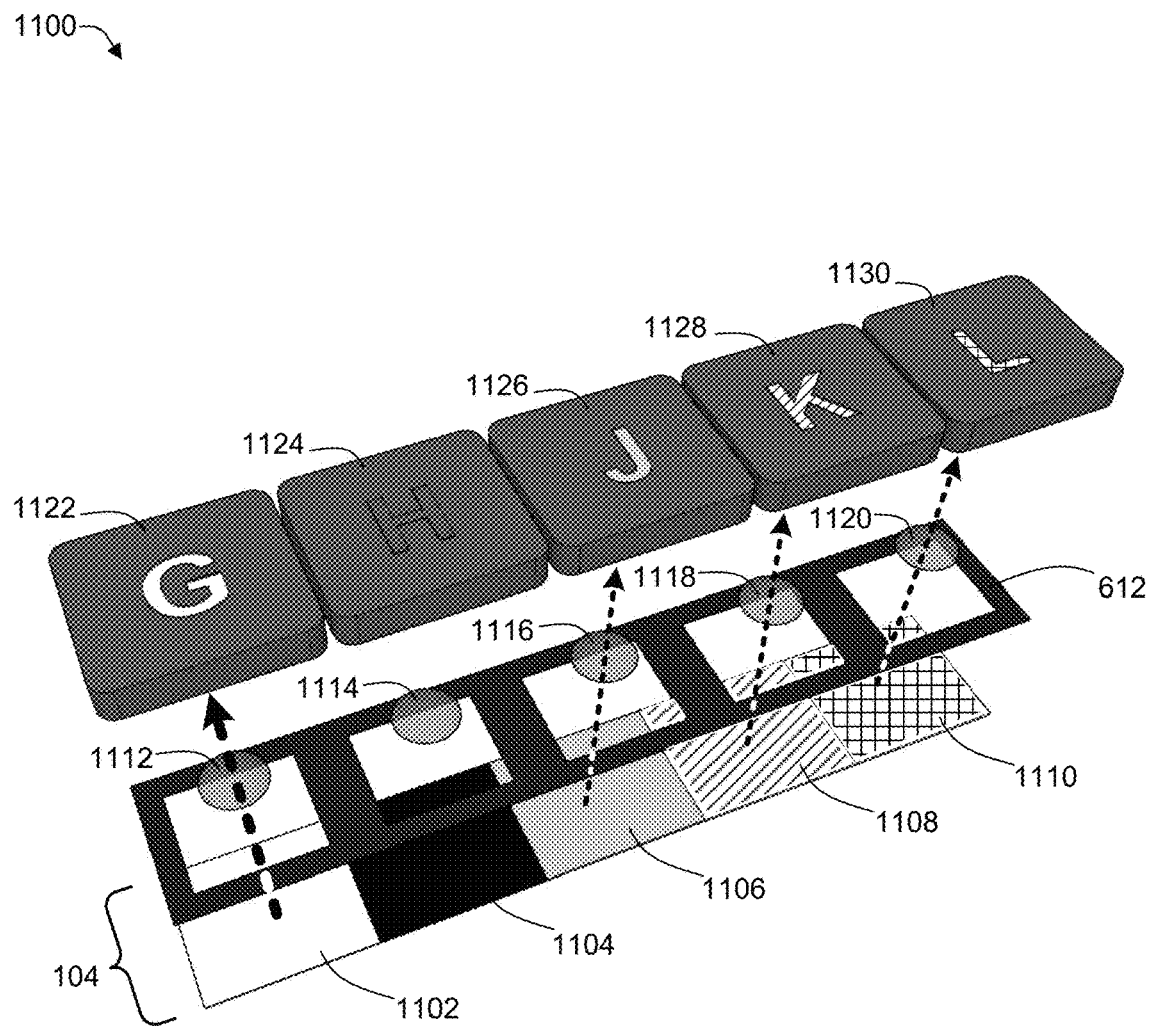
FIG. 11 is a detail view of a section of a keyboard device illustrating how a display located below the keyboard device may alter the on/off state, intensity, color, and temporal pattern of the keyboard device backlighting according to some embodiments.

FIG. 11 is a detail view 1100 illustrating how a second display device 104 of a dual-display computing device 100 can control the on/off state, intensity, and color of keys on a keyboard 170 when the backlight for the keyboard 170 is provided by the second display device 104.

When the keyboard 170 is located on (e.g. over a portion of) the second display device 104 and the backlight for the keyboard 170 is being provided by the second display device 104, the dual-display computing device 100 may control the appearance of each key on the keyboard by changing the image being displayed on the second display device 104 on the portion of the second display device 104 that is beneath the key. For example, the dual-display computing device 100 may control whether or not the key is backlit, an intensity of the key backlight, a color of the key backlight, and the like. By changing the appearance of specific areas of the second display device 104, software on the dual-display computing device 100 may control the appearance of keys on the keyboard 170, either individually or in groups, including the ability to change the coloring of the key or make the keys blink. For example, when a prompt is displayed, the "Y" key cap and the "N" key cap may each blink to indicate that the user may select "Y" for "yes" or "N" for "no" to respond to the prompt.

As non-limiting example, if a first display portion 1102 of the second display device 104 that is beneath the 'G' key is programmed to show a white field, then the light from the white field may be focused onto a first keycap 1122 above the white field to illuminate the letter 'G' on the first keycap 1122. The light may pass through a light separating mask 612 and a first lens 1112 in passing from the first display portion 1102 of the second display device 104 to the first keycap 1122. If a second display portion 1104 of the second display device 104 that is beneath the 'H' key is programmed to show a black field, then the absence of light from the black field may cause a second keycap 1124 above the black field to darken the letter 'H' on the second keycap 1124. Minimal light, if any, may pass through the light separating mask 612 and a second lens 1114 in passing from the second display portion 1104 of the second display device 104 to the second keycap 1124. If a third display portion 1106 of the second display device 104 that is beneath the 'J' key is programmed to show a gray field where the gray field is darker than the white field and brighter than the black field, then the light from the gray field may be focused onto a third keycap 1126 above the gray field to illuminate the letter 'J' on the third keycap 1126 and the letter 'J' may appear to be dimmer than the left 'G' described above. The light may pass through the light separating mask 612 and a third lens 1116 in passing from the third display portion 1106 of the second display device 104 to the third keycap 1126. If a fourth display portion 1108 of the second display device 104 that is beneath the 'K' key is programmed to show a green field, then the light from the green field may be focused onto the keycap above the green field to illuminate the letter 'K' on a fourth keycap 1128 and the letter 'K' may appear to be green. The light may pass through the light separating mask 612 and a fourth lens 1118 in passing from the fourth display portion 1108 of the second display device 104 to the fourth keycap 1128. If a fifth display portion 1110 of the second display device 104 that is beneath the 'L' key is programmed to alternate between the white field and the black field with a period of 1 second, then the light from the white field may be focused onto a fifth keycap 1130 above the white field to illuminate the letter 'L' on the keycap and the absence of light from the black field may cause the fifth keycap 1130 above the black field to darken the letter 'L' on the fifth keycap 1130. The light may pass through the light separating mask 612 and a fifth lens 1120 in passing from the fifth display portion 1110 of the second display device 104 to the fifth keycap 1130. The letter 'L' may appear to blink on and off with a period of 1 second.

In some embodiments, the ability to change the brightness of individual keys by controlling the intensity of a display field below the key may be used to compensate for differences in the light path associated with each key. As a non-limiting example, if a first key appears to be dimmer than a second key because of differences in the key sizes, differences in the key mechanisms, or other differences between the keys, then the intensity of the display area under the second key may be reduced such that the brightness of both keycaps appears to be approximately (e.g., imperceptibly) the same. In this way, the intensity of all keys on the keyboard 170 may be adjusted to be brighter or dimmer by changing the appearance of the second display device 104 under each key until all keys appear to have a similar or same brightness. The resulting display intensities may be saved and recalled each time that the keyboard 170 is placed onto the second display device 104.

Thus, the dual-display computing device 100 may change the on/off state, the intensity, and the color of keycaps 702 when the keyboard 170 is located on the second display device 104 and the second display device 104 is providing the backlighting of the keyboard 170 by changing the appearance of areas of the second display device 104 that lie directly beneath affected keys. The dual-display computing device 100 may also cause the appearance of the keycaps 702 to change over time by changing the appearance of portions of the second display device 104 over time.

Figure 12:
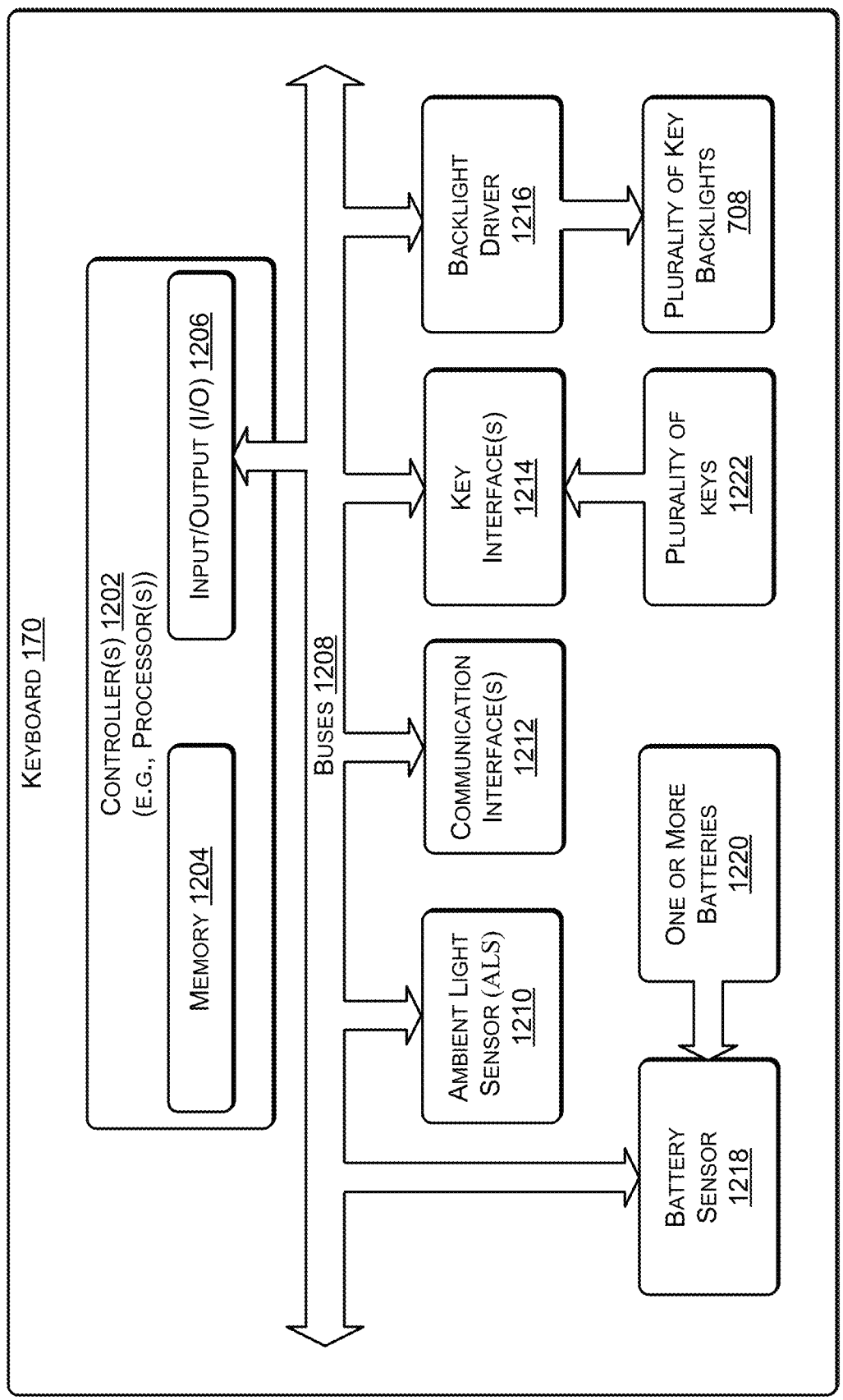
FIG. 12 is a block diagram of an architecture of a keyboard device according to some embodiments.

FIG. 12 is a block diagram of an architecture of a keyboard 170 according to some embodiments. In some implementations, the keyboard 170 may comprise a keyboard controller 1202. As a non-limiting example, the keyboard controller 1202 may be a microprocessor or microcontroller that directs the operation of all elements of the keyboard 170. The keyboard 170 may comprise a keyboard memory 1204 and one or more keyboard I/O ports 1206. In some embodiments, the keyboard controller 1202 may be a single-chip microcontroller where the keyboard controller 1202, the keyboard memory 1204 and the one or more keyboard I/O ports 1206 reside in a single package. Software instructions implementing an operating system and one or more applications, including at least one application capable of scanning a plurality of keys 1222, communicating keystrokes to an external device, and managing key backlights 708 may be stored in the keyboard memory 1204 and executed by the keyboard controller 1202.

The keyboard controller 1202 may communicate with other elements of the keyboard 170 via keyboard buses 1208. As non-limiting examples, the keyboard controller 1202 may communicate with a keyboard ambient light sensor 1210, one or more keyboard communication interfaces 1212, a key interface 1214, one or more backlight drivers 1216, and a keyboard battery sensor 1218 via the keyboard buses 1208.

The keyboard ambient light sensor 1210 may provide one or more parameters to the keyboard controller 1202 that are indicative of the ambient light level outside of the keyboard 170. As a non-limiting example, the keyboard controller 1202 may use this information, by itself or in combination with other information, to make a determination regarding when the key backlights 708 should be turned on or off.

The one or more keyboard communication interfaces 1212 may provide a wireless interface to an external device. As a non-limiting example, the external device may be a dual-display computing device 100. As non-limiting examples, the one or more keyboard communication interfaces 1212 may provide a Bluetooth link, an NFC link, a Zigbee link, a Wi-Fi link, an optical link, a proprietary communication link, or combinations thereof. The communications interface 1212 may be capable of providing wireless communications (e.g., Bluetooth, ZigBee, IEEE 802.11, or the like), wired communications (e.g., via USB), or both. For example, when a USB cable is used to connect the keyboard 170 to the computing device 100, the USB cable may enable the computing device 100 to provide power (e.g., via USB) to the keyboard 170. The power provided from the computing device 100 via the USB cable may be used to power the keyboard 170, including the plurality of key backlights 708, and to charge the one or more batteries 1220 (if the batteries 1220 are rechargeable).

The key interface 1214 may provide one or more input and/or output lines to the plurality of keys 1222. Using the key interface 1214, the keyboard controller 1202 may be able to determine the pressed/released state of each individual key selected from the plurality of keys 1222 and may communicate the status of the plurality of keys 1222 to the external device. As non-limiting examples, the key interface 1214 may provide a single line to each key comprising the plurality of keys 1222, may provide a matrix of row lines and columns lines that intersect at individual keys, may provide a single serial line to a plurality of keys, or combinations thereof.

The one or more backlight drivers 1216 may control the on/off state of the key backlights 708 that are located through the keyboard 170. Under the command of the keyboard controller 1202, the one or more backlight drivers 1216 may turn the key backlights 708 on such that keycaps 702 are illuminated using energy provided by one or more keyboard batteries 1220 or may turn the key backlights 708 off such that the keycaps 702 are either not illuminated or are illuminated from an external source of illumination. In some embodiments, the one or more backlight drivers 1216 may control the intensity of the illumination.

The keyboard battery sensor 1218 may sense one or more electrical characteristics of the one or more keyboard batteries 1220 and may report the electrical characteristics to the keyboard controller 1202 such that the keyboard controller 1202 may estimate the percentage of the battery life that is remaining.

The one or more keyboard batteries 1220 may comprise one or more energy-storage devices. The one or more keyboard batteries 1220 may be a source of electrical energy to operate the keyboard controller 1202, the keyboard memory 1204, the one or more keyboard I/O ports 1206, the keyboard ambient light sensor 1210, the one or more keyboard communication interfaces 1212, the key interface 1214, the one or more backlight drivers 1216, the keyboard battery sensor 1218, the key backlights 708 and other electrical components that might be located within the keyboard 170. The one or more keyboard batteries 1220 may be replaceable or rechargeable.

Thus, a keyboard 170 may include software that monitors the plurality of keys 1222 for activity and reports the key activity to an external device via the one or more keyboard communication interfaces 1212. Software may also make a determination as to whether or not the one or more backlight drivers 1216 should be used to illuminate the key backlights 708 based upon parameters provided by the keyboard battery sensor 1218 and the keyboard ambient light sensor 1210.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A keyboard device comprising:
    a keyboard controller,
    a plurality of keys,
    one or more keyboard communication interfaces,
    one or more keyboard batteries, and
    one or more unobstructed pathways through the keyboard device to enable an external light source located below the keyboard device to illuminate individual keycaps of the plurality of keys, wherein the one or more unobstructed pathways comprise at least one of a transparent material or one or more areas devoid of material, and wherein the external light source comprises a display device of a dual-display computing device; and
    wherein placing the keyboard device on the display device of the dual-display computing device causes the dual-display computing device to:
        determine, based on ambient light data received from one or more ambient light sensors of the dual-display computing device, that an amount of ambient light associated with the dual-display computing device satisfies an ambient light threshold;
        determine that the keyboard device is located on the display device;
        instruct the keyboard device to disable one or more internal backlights located in the keyboard device; and
        cause the display device to emit an amount of light sufficient to backlight a plurality of keycaps of the keyboard device.

2. The keyboard device according to claim 1, further comprising:
    a plurality of key backlights;
    one or more backlight drivers;
    wherein:
        the plurality of key backlights are disposed within the plurality of keys such that, when the plurality of key backlights are enabled, at least a subset of the plurality of keys are backlit;
        the one or more backlight drivers allow the keyboard controller to enable or disable the plurality of key backlights;
        the plurality of key backlights are powered by the one or more keyboard batteries stored in the keyboard device;
        the keycaps are backlit by light originating from the plurality of key backlights in response to the keyboard controller determining that:
            the keyboard device is not located on top of the external light source; and ambient light data received from a keyboard ambient light sensor of the keyboard device indicates that an amount of ambient light satisfies a predetermined threshold.

3. The keyboard device according to claim 2, further comprising:
the ambient light data provided by the keyboard ambient light sensor of the keyboard device indicating an amount of ambient light;
wherein the keyboard controller is operable to:
disable the plurality of key backlights in response to determining, based on the ambient light data, that an ambient light level satisfies a predetermined ambient light threshold; and
enable the plurality of key backlights in response to determining, based on the ambient light data, that the ambient light level does not satisfy the predetermined ambient light threshold.

4. The keyboard device according to claim 2, further comprising:
a keyboard battery sensor to determine a remaining battery level of the one or more keyboard batteries;
wherein the keyboard controller is operable to:
disable the plurality of key backlights in response to determining, based on the ambient light data, that an ambient light level satisfies a predetermined ambient light threshold; and
enable the plurality of key backlights in response to determining, based on the ambient light data, that the ambient light level does not satisfy the predetermined ambient light threshold.

5. The keyboard device according to claim 1, wherein:
the keyboard device is coupled in a fixed position relative to either a first display device or a second display device of the dual-display computing device using at least one of:
a mechanical coupling mechanism;
an electromechanical coupling mechanism; or
a magnetic coupling mechanism to retain the keyboard device.

6. The keyboard device according to claim 5, wherein:
the keyboard device determines a presence of the dual-display computing device after being coupled to the dual-display computing device using at least one of:
an electromechanical sensor;
an optical sensor; or
a magnetic sensor.

7. The keyboard device according to claim 5, wherein the external light source comprises one of the first display device or the second display device.

8. A system comprising:
a keyboard device comprising:
a plurality of keys; and
one or more unobstructed pathways to enable light from an external light source located below the keyboard device to pass through the unobstructed pathways to illuminate individual keycaps of the plurality of keys, wherein the one or more unobstructed pathways comprise at least one of transparent material or one or more areas devoid of material; and
a dual-display computing device comprising:
a first display device; and
a second display device;
wherein based on the dual-display computing device determining that:
an amount of ambient light associated with the dual-display computing device satisfies an ambient light threshold; and
the keyboard device is located on the external light source comprising either the first display device or the second display device,
disabling one or more internal backlights located in the keyboard device; and
causing at least a portion of the external light source to emit light, to backlight individual keycaps of a plurality of keys of the keyboard device.

9. The system according to claim 8, wherein the dual-display computing device further comprises:
a memory storage device to store software instructions; and
one or more processors to execute the software instructions to:
perform a modification to an illumination of individual keycaps of the plurality of keys, wherein the modification comprises at least one of:
turning on and off a backlight of individual keycaps of the plurality of keys;
modifying an intensity of the backlight of individual keycaps of the plurality of keys; or
modifying a color of the backlight of individual keycaps of the plurality of keys.

10. The system according to claim 9, wherein the one or more processors further execute the software instructions to:
display a specialized input area on a portion of the second display device that is not located below the keyboard device, wherein the specialized input area comprises at least one of:
a trackpad;
a numeric keypad; or
a plurality of commands used by a particular software application.

11. The system according to claim 9, wherein the one or more processors further execute the software instructions to:
receive ambient light data from an ambient light sensor located in the first display device or the keyboard device;
determine, based on the ambient light data, an amount of ambient light associated with the dual-display computing device; and
modify, based on the amount of ambient light, an image presented on the second display device to modify the backlight of individual keycaps of the plurality of keys.

12. The system according to claim 11, wherein modifying, based on the amount of ambient light, the image presented on the second display device to modify the backlight of individual keycaps of the plurality of keys comprises:
retrieving a previously stored keyboard brightness profile; and
modifying a brightness of individual keycaps such that individual keycaps of the plurality of keys are perceived as having a uniform brightness compared to other keycaps of the plurality of keys.

13. The system according to claim 8, wherein:
the keyboard device is coupled to the dual-display computing device in a fixed position using at least one of:
a mechanical coupling device,
an electromechanical coupling device, or
a magnetic coupling device.

14. The system according to claim 8, wherein:
the dual-display computing device determines a presence of the keyboard device based on sensor data received from at least one of a electromechanical sensor, an optical sensor, or a magnetic sensor.

15. A method, comprising:

receiving, by one or more processors of a dual-display computing device, ambient light data from one or more ambient light sensors located in the dual-display computing device, the dual-display computing device comprising at least a first display device and a second display device;

determining, by the one or more processors and based on the ambient light data, that an amount of ambient light associated with the dual-display computing device satisfies an ambient light threshold;

determining, by the one or more processors, to backlight a plurality of keycaps of a keyboard device;

based on determining, by the one or more processors, that the keyboard device is located on an external light source:
- disabling one or more internal backlights located in the keyboard device; and
- causing at least a portion of the external light source to emit light, wherein the light emitted by the external light source travels through one or more unobstructed pathways in the keyboard device to backlight individual keycaps of the plurality of keys of the keyboard device.

16. The method of claim 15, wherein the external light source comprises one of the first display device or the second display device.

17. The method of claim 15, further comprising:

determining, by the one or more processors, that the keyboard device is not located on the external light source;

determining, by the one or more processors, that a remaining battery level of batteries used to power the keyboard device satisfy a predetermined battery threshold; and enabling the one or more internal backlights located in the keyboard device to backlight the individual keycaps of the plurality of keys.

18. The method of claim 15, further comprising:

determining, by the one or more processors, that the keyboard device is not located on the external light source;

determining, by the one or more processors, that a remaining battery level of keyboard batteries used to power the keyboard device fail to satisfy a predetermined battery threshold; and disabling the internal backlights located in the keyboard device to prolong a battery life of the keyboard batteries.

19. The method of claim 15, further comprising:

determining, by the one or more processors, that the keyboard device is connected to the dual-display computing device by a universal serial bus (USB) cable; and enabling the internal backlights located in the keyboard device, wherein the internal backlights are powered by power from the USB cable.

20. The method of claim 19, further comprising:

determining, by the one or more processors, that keyboard batteries powering the keyboard device comprise rechargeable batteries; and recharging, by the one or more processors, the keyboard batteries using the power from the USB cable.

* * * * *